US009599759B2

(12) United States Patent
Hatanaka

(10) Patent No.: US 9,599,759 B2
(45) Date of Patent: Mar. 21, 2017

(54) PATTERNED POLARIZING FILM AND ITS PRODUCTION PROCESS

(71) Applicant: Sumitomo Chemical Company, Limited, Tokyo (JP)

(72) Inventor: Nobuyuki Hatanaka, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 118 days.

(21) Appl. No.: 14/687,494

(22) Filed: Apr. 15, 2015

(65) Prior Publication Data

US 2015/0301251 A1 Oct. 22, 2015

(30) Foreign Application Priority Data

Apr. 18, 2014 (JP) .................................. 2014-086131
Apr. 18, 2014 (JP) .................................. 2014-086133

(51) Int. Cl.
*G02F 1/13* (2006.01)
*G02F 1/1335* (2006.01)
(Continued)

(52) U.S. Cl.
CPC .......... *G02B 5/3016* (2013.01); *B29C 55/005* (2013.01); *B29D 11/0073* (2013.01); *B29D 11/00317* (2013.01); *B29D 11/00644* (2013.01); *G02B 5/3033* (2013.01); *G02F 1/133502* (2013.01); *G02F 1/133528* (2013.01);
(Continued)

(58) Field of Classification Search
CPC ........ B29D 11/00317; B29D 11/00644; B29D 11/0073; B29C 55/005; B29C 55/06; G02B 5/3016; G02B 5/3033; B29K 2995/0034; B29K 2995/0021; B29K 2105/0079; B29L 2011/0066; G02F 1/133502;
(Continued)

(56) References Cited

U.S. PATENT DOCUMENTS

| 5,327,285 A | 7/1994 | Faris |
| 7,765,330 B2 | 7/2010 | Kim |

(Continued)

FOREIGN PATENT DOCUMENTS

| JP | H06-034976 A | 2/1994 |
| JP | 2006-337892 A | 12/2006 |
| JP | 2008-129465 A | 6/2008 |
| JP | 2010-031223 A | 2/2010 |
| JP | 2010-270108 A | 12/2010 |
| JP | 2011-006360 A | 1/2011 |
| JP | 4719156 B2 | 7/2011 |
| JP | 2011-207765 A | 10/2011 |
| JP | 2011-242743 A | 12/2011 |
| JP | 2013-101328 A | 5/2013 |

OTHER PUBLICATIONS

JIS Z 8701 (Japanese Industrial Standard), "Colour specification—The CIE 1931 standard colorimetric system and the CIE 1964 supplementary standard colorimetric system" (1999).

*Primary Examiner* — Hoan C Nguyen
(74) *Attorney, Agent, or Firm* — Panitch Schwarze Belisario & Nadel LLP

(57) ABSTRACT

A patterned polarizing film is provided for obtaining a thin patterned circular polarizing plate having a superior anti-reflection property. The film includes a substrate and a patterned liquid crystal cured layer laminated thereon. The layer contains a polymer of a polymerizable liquid crystal compound(s) and a dichroic dye. The patterned polarizing film includes a region (A) having a degree of polarization of 10% or lower and a single transmittance of 80% or higher, and a region (B) having a degree of polarization of 90% or higher and a single transmittance of 40% or higher.

20 Claims, 3 Drawing Sheets

(51) Int. Cl.
  *G02B 5/30* (2006.01)
  *G02F 1/1337* (2006.01)
  *B29D 11/00* (2006.01)
  *B29C 55/00* (2006.01)
  *B29L 11/00* (2006.01)
  *B29K 105/00* (2006.01)
  *B29C 55/06* (2006.01)
  *G02F 1/13363* (2006.01)

(52) U.S. Cl.
  CPC .. *G02F 1/133711* (2013.01); *G02F 1/133788* (2013.01); *B29C 55/06* (2013.01); *B29K 2105/0079* (2013.01); *B29K 2995/0021* (2013.01); *B29K 2995/0034* (2013.01); *B29L 2011/0066* (2013.01); *G02F 1/13363* (2013.01); *G02F 2001/133541* (2013.01)

(58) Field of Classification Search
  CPC ......... G02F 1/133528; G02F 1/133711; G02F 1/133788; G02F 2001/13
  USPC .......................................................... 349/96
  See application file for complete search history.

(56) References Cited

U.S. PATENT DOCUMENTS

| | | | | |
|---|---|---|---|---|
| 7,817,225 | B2* | 10/2010 | Yoshihide | G02F 1/13362 349/96 |
| 8,383,212 | B2 | 2/2013 | Obata et al. | |
| 8,545,970 | B2 | 10/2013 | Doi et al. | |
| 2008/0259232 | A1* | 10/2008 | Kim | G02F 1/133528 349/15 |
| 2012/0249900 | A1* | 10/2012 | Koike | G02F 1/133528 349/15 |
| 2013/0114136 | A1* | 5/2013 | Saito | G02B 5/3016 359/465 |
| 2014/0313581 | A1* | 10/2014 | Kashima | G02B 5/3016 359/489.07 |

\* cited by examiner

PATTERNED POLARIZING FILM AND ITS PRODUCTION PROCESS

FIELD OF THE INVENTION

The present application claims the Paris Convention priority based on Japanese Patent Applications No. 2014-086131 and No. 2014-086133 filed on Apr. 18, 2014, the entire content of which is incorporated herein by reference.

The present invention relates to a patterned polarizing film and its production process.

BACKGROUND OF THE INVENTION

Patent Document 1 describes a patterned polarizing film with a polyvinyl alcohol polarizing layer, and a circular polarizing plate comprising the polarizing film. However, there are problems in that the process for producing the polarizing film is complex and that the film is thick. Patent Document 2 describes a polarizing film comprising a polarizer consisting of a coating layer, and a circular polarizing plate comprising the polarizing film. However, a patterned polarizing film comprising a patterned polarizer consisting of a coating layer has not been known.

Patent Document 1: U.S. Pat. No. 5,327,285 B
Patent Document 2: JP 2006-337892 A

SUMMARY OF THE INVENTION

A patterned polarizing film for obtaining a thin patterned circular polarizing plate having a superior anti-reflection property has been needed. In addition, a process for producing a patterned polarizing film comprising a region having a high degree of polarization and a region having a high single transmittance has been needed.

The present invention includes the following embodiments.

[1] A patterned polarizing film laminated a substrate and a patterned liquid crystal cured layer comprising a dichroic dye and a polymer of a polymerizable liquid crystal compound(s), the patterned polarizing film has one or more regions (A) and one or more regions (B), wherein the patterned polarizing film has a region (A) having a degree of polarization of 10% or lower and a single transmittance of 80% or higher, and a region (B) having a degree of polarization of 90% or higher and a single transmittance of 40% or higher.

[2] The patterned polarizing film according to [1], wherein the region (B) has the liquid crystal cured layer.

[3] The patterned polarizing film according to [1] or [2], wherein the region (A) and the region (B) have a shape comprising a linear shape, a zonation shape, a circular shape, a character-shape and a figure-shape independently each other.

[4] The patterned polarizing film according to [3], wherein the region (A) has a linear shape and has a width of 1 μm to 10 mm.

[5] The patterned polarizing film according to claim [3], wherein the region (B) has a linear shape and has a width of 1 μm to 10 mm.

[6] The patterned polarizing film according to [3], wherein the region (A) has a zonation shape, a circular shape, a character-shape or a figure-shape, and wherein each of the one or more regions (A) has an area of 500 mm$^2$ or less.

[7] The patterned polarizing film according to [3], wherein the region (B) has a zonation shape, a circular shape, a character-shape or a figure-shape, and wherein each of the one or more regions (B) has an area of 500 mm$^2$ or less.

[8] The patterned polarizing film according to [1] or [2], wherein the patterned polarizing film has the region (A) and the region (B) in stripes.

[9] The patterned polarizing film according to [8], wherein the region (B) has a width of 1 μm to 10 mm.

[10] The patterned polarizing film according to [8], wherein the region (B) has a width of 1 μm to 1 mm.

[11] A patterned polarizing film according to [1], wherein the substrate is a retardation film having a quarter wavelength plate function.

[12] A patterned polarizing film according to [1], wherein the patterned polarizing film further comprises a retardation film having a quarter wavelength plate function.

[13] The patterned polarizing film according to [11] or [12], wherein the retardation film having a quarter wavelength plate function has a reverse wavelength dispersibility.

[14] A patterned polarizing film according to [1], wherein the substrate is a retardation film having a half wavelength plate function, and wherein a retardation film having a quarter wavelength plate function is further laminated on the substrate.

[15] The patterned polarizing film according to any one of [11], [12] and [14], wherein the patterned circular polarizing plate further comprises a positive C film.

[16] A process for producing a patterned polarizing film according to [1], the process comprising the following steps (1) to (4):

(1) a step of applying a composition comprising a polymerizable liquid crystal compound and a dichroic dye to a surface of a substrate or a substrate on which an orientation layer has been formed, (2) a step of orientating the applied polymerizable liquid crystal compound and the applied dichroic dye, (3) a step of applying an active energy ray to the orientated polymerizable liquid crystal compound through a photomask, thereby obtaining a liquid crystal cured layer comprising a polymer of the polymerizable liquid crystal compound and a unpolymerized polymerizable liquid crystal compound, and (4) a step of washing the liquid crystal cured layer with a solvent in which the dichroic dye has a saturated solubility at 23° C. of 1% by mass or lower, and thereby removing the unpolymerized polymerizable liquid crystal compound, thereby obtaining a patterned liquid crystal cured layer.

[17] The process for producing a patterned polarizing film according to [16], wherein the substrate is a resin substrate.

[18] The process for producing a patterned polarizing film according to [16] or [17], wherein the solvent is a solvent comprising an alcohol solvent.

[19] The process for producing a patterned polarizing film according to [16], wherein the active energy ray is applied while the photomask is appressed to the orientated polymerizable liquid crystal compound.

[20] The process for producing a patterned polarizing film according to [16], wherein the active energy ray is an ultraviolet ray that is parallel to the normal direction of a surface of the substrate.

According to the patterned polarizing film of the present invention, it is possible to obtain a thin patterned circular polarizing plate having a superior anti-reflection property. In addition, according to the process for a patterned polarizing film of the present invention, it is possible to obtain a patterned polarizing film comprising a region having a high degree of polarization and a region having a high single transmittance.

DETAILED DESCRIPTION OF EMBODIMENTS

<Patterned Polarizing Film>

Figure 1:
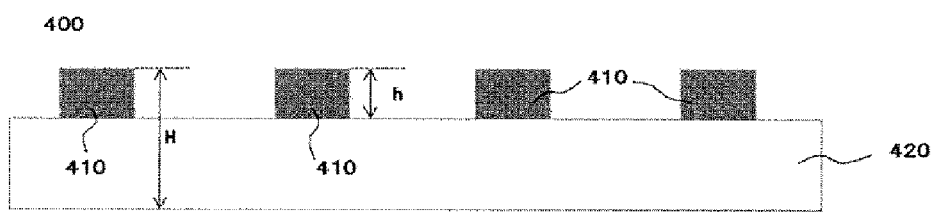
FIG. 1 is a cross-sectional diagram of the patterned polarizing film of the present invention.

The patterned polarizing film of the present invention is a laminated product of a substrate and a patterned liquid crystal cured layer. The patterned liquid crystal cured layer refers to a liquid crystal cured layer having a desired design. The laminated product refers to a product wherein a liquid crystal cured layer forms a desired design on the substrate.

It is preferable that an orientation layer is further laminated between the substrate and the liquid crystal cured layer. That is to say, the patterned polarizing film of the present invention is preferably a laminated product of the substrate, the orientation layer and the liquid crystal cured layer.

In the present specification, a degree of polarization refers to a degree of converting natural light to linear polarization light. A degree of polarization is defined according to following formula (11), and may be a value from 0 to 100%. When this value is 100%, a light emitted from the polarizing film is a completely linear polarization light, and if the value is closer to 100%, the light emitted from the polarizing film becomes a polarization light having higher selectivity, and is thus a superior polarizing film.

$$\text{Degree of polarization (\%)} = \{(T^1 - T^2)/(T^1 + T^2)\} \times 100 \quad (11)$$

In the formula, each of $T^1$ and $T^2$ represents a transmittance when a linear polarization light is made incident on a polarizing film, $T^1$ represents a transmittance which is measured when a linear polarization light parallel to a transmission axis direction is made incident on the polarizing film, and $T^2$ represents a transmittance which is measured when a linear polarization light parallel to an absorption axis direction is made incident on the polarizing film.

In the present specification, a single transmittance refers to a value for showing how much a polarizing film transmits an incident light. A single transmittance is defined according to following formula (10), and may be a value from 0 to 100%. When this value is 100%, a polarizing film transmits all of an incident light, and when the value is 0%, a polarizing film absorbs or reflects all of an incident light.

$$\text{Single transmittance (\%)} = (T^1 + T^2)/2 \quad (10)$$

In the formula, $T^1$ and $T^2$ are as defined above.

In the present specification, as to a patterned polarizing film comprising a dye for controlling only a light having certain wavelength, which is called a color polarizing film, values measured at a maximum wavelength showing light absorption are defined as a degree of polarization and a single transmittance of a patterned polarizing film. In addition, as to a patterned polarizing film obtained by mixing multiple dyes, which is called a neutral gray polarizing film, a luminous degree of polarization and a luminous transmittance are respectively defined as a degree of polarization and a single transmittance of a patterned polarizing film in order to express a polarizing performance over all range of visible light.

A degree of polarization of a region obtained by masking with a photomask (hereinafter, also referred to as "region (A)") is usually 10% or lower, preferably 5% or lower, and more preferably 1% or lower. The degree of polarization tends to decrease when the amount of the liquid crystal cured layer existing in the region decreases. That is to say, it is preferable that the region (A) does not have a liquid crystal cured layer. In this invention, the patterned polarizing film has one or more regions (A).

When the single transmittance of the region (A) is closer to 100%, transparency is higher, and it can be thus considered to be more practical in use for a display or the like. On the other hand, this single transmittance is a value including reflection loss involved in a difference in index of refraction between air interface and a polarizing film, and thus, the theoretical maximum value is approximately from 88 to 94% although it also depends on materials of a substrate or the like. The single transmittance of the region (A) is usually 80% or higher, preferably 85% or higher, and more preferably 88% or higher. The single transmittance of the patterned polarizing film of the present invention tends to increase when the amount of the liquid crystal cured layer existing in the region decreases.

A degree of polarization of a region in which a liquid crystal cured layer is formed (hereinafter, also referred to as "region (B)") is usually 65% or higher, preferably 85% or higher, more preferably 90% or higher, further preferably 92% or higher, and particularly preferably 95% or higher. The region (B) usually has a liquid crystal cured layer. When a degree of orientation order of a polymer of the polymerizable liquid crystal compound contained in the liquid crystal cured layer is higher, a degree of polarization of the region (B) tends to be higher. In this invention, the patterned polarizing film has one or more regions (B).

Since most of a polarization light in a direction perpendicular to a transmission axis direction is lost due to absorption, the theoretical maximum value of the single transmittance of the region (B) is approximately from 44 to 47%. The single transmittance of the region (B) is usually 40% or higher, preferably 42% or higher, and more preferably 44% or higher.

Example of a shape of the region (A) includes a linear shape, a zonation shape, a circular shape, a character-shape and a figure-shape, and can be a desired shape. The shape of the region (A) is preferably a linear shape. Example of a shape of the region (B) includes a linear shape, a zonation shape, a circular shape, a character-shape and a figure-shape, and can be a desired shape. The shape of the region (B) is preferably a linear shape. The patterned polarizing film preferably has the region (A) and the region (B) in stripes. A term "pattern" in the patterned polarizing film means a design, and may also exist only in a part or multiple parts. The pattern is preferably a regular design.

When the shape of the region (A) is linear, the width of the region is preferably from 1 μm to 10 mm, more preferably from 1 μm to 1 mm, and further preferably from 1 μm to 100 μm.

When the shape of the region (B) is linear, the width of the region is preferably from 1 μm to 10 mm, more preferably from 1 μm to 1 mm, and further preferably from 1 μm to 100 μm.

When the patterned polarizing film has the region (A) and the region (B) in stripes, the width of the region (B) is preferably from 1 μm to 10 mm, more preferably from 1 μm to 1 mm, and further preferably from 1 μm to 100 μm.

An area of the region (A) is preferably 100 mm$^2$ or less. The area of the region (A) does not refers to the sum of the area(s) of region(s) (A) in the whole patterned polarizing film, but refers to an area per one region (A).

An area of the region (B) is preferably 100 mm$^2$ or less. The area of the region (B) does not refer to the sum of the area(s) of region(s) (B) in the whole patterned polarizing film, but refers to an area per one region (B).

The sum of the surface areas of the region (A) and the region (B), relative to the surface area of the patterned polarizing film of the present invention, is preferably 90% or higher, more preferably 95% or higher, and further preferably 99% or higher.

FIG. 1 represents a cross-sectional diagram of patterned polarizing film 400 of the present invention. In patterned polarizing film 400, substrate 420 and liquid crystal cured layer 410 are laminated, and liquid crystal cured layer 410 is a patterned liquid crystal cured layer. In the figure, H represents a thickness of a region wherein liquid crystal cured layer 410 is laminated, and h represents a thickness of the liquid crystal cured layer.

The thickness of the region wherein the liquid crystal cured layer is laminated in the patterned polarizing film is usually from 6 to 310 μm, and preferably from 20 to 200 μm.

The thickness of the liquid crystal cured layer is usually from 0.5 to 10 μm, and preferably from 1 to 5 μm. The thickness of the liquid crystal cured layer can be measured with an interference thickness meter, a laser microscope or a contact-type thickness meter.

The liquid crystal cured layer is preferably a layer wherein a Bragg peak is obtained in X-ray diffraction measurement. Such a liquid crystal cured layer wherein a Bragg peak is obtained, for example, tends to represent a diffraction peak derived from a hexatic phase or a crystal phase, and to represent a high degree of polarization.

The liquid crystal cured layer is usually formed from a composition comprising polymerizable liquid crystal compound and a dichroic dye. In the present specification, this composition may be referred to as "composition for forming a liquid crystal cured layer".

<Patterned Circular Polarizing Plate>

A patterned circular polarizing plate showing circular polarization performance is obtained by using a retardation film having a quarter wavelength plate function as the substrate of the patterned polarizing film or by laminating this retardation film with the patterned polarizing film. The lamination of them is preferably carried out in a way making substantially 45 degrees between a transmission axis of the region (B) in the patterned polarizing film and a slow axis (optical axis) in the quarter wavelength plate.

A patterned circular polarizing plate is obtained by laminating the patterned polarizing film of the present invention and a retardation film having a quarter wavelength plate function (hereinafter, also referred to as "quarter wavelength plate"). In this case, the lamination is preferably carried out in such a way that a transmission axis of the region (B) in the patterned polarizing film and a slow axis (optical axis) in the quarter wavelength plate make substantially 45 degrees. "Substantially 45 degrees" usually refers to a range of 45±5 degrees. When the transmission axis of the region (B) and the optical axis in the retardation film are identical or perpendicular to each other, a patterned polarizing film serving as an optical compensation film can be obtained.

The quarter wavelength plate usually has an optical property represented by formula (40), and preferably has an optical property represented by formula (40-1).

$$100 \text{ nm} < Re(550) < 160 \text{ nm} \tag{40}$$

$$130 \text{ nm} < Re(550) < 150 \text{ nm} \tag{40-1}$$

Re(550) represents an in-plane retardation value for a light having wavelength of 550 nm.

In addition, the quarter wavelength plate preferably has a reverse wavelength dispersibility. The reverse wavelength dispersibility refers to such an optical property that an in-plane retardation value at a shorter wavelength is bigger than an in-plane retardation value at a longer wavelength, and preferably formula (50) and formula (51) are satisfied. Re(λ) represents an in-plane retardation value for a light having wavelength of λnm. A patterned circular polarizing plate comprising a quarter wavelength plate having the optical property satisfying formula (50) and formula (51) tends to be superior in anti-reflection property, since an even polarization conversion property for a light having each wavelength in a visual light range is obtained by the plate.

$$Re(450)/Re(550) \leq 1.00 \tag{50}$$

$$1.00 \leq Re(630)/Re(550) \tag{51}$$

The quarter wavelength plate may be also a coating layer obtained by polymerizing a polymerizable liquid crystal compound, or a stretched film. The quarter wavelength plate having the optical property satisfying formula (50) and formula (51) is obtained by polymerizing a certain polymerizable liquid crystal compound, or by stretching a film of a polymer(s) having a certain structure. The polymerizable liquid crystal compound may be also identical to or different from the polymerizable liquid crystal compound contained in the composition for forming a liquid crystal cured layer. A commercial available product of the polymerizable liquid crystal compound may be also used, and examples of the commercial available product include product name "LC242" manufactured by BASF. Examples of the certain polymerizable liquid crystal compound satisfying formulae (50) and (51) include the compound described in JP 5463666 B.

The direction of the slow axis of the quarter wavelength plate is preferably at 0±10 degrees or 90±10 degrees relative to the longitudinal direction of the quarter wavelength plate. The patterned circular polarizing plate can be easily obtained by using such a quarter wavelength plate.

When the quarter wavelength plate is a coating layer formed by polymerizing a polymerizable liquid crystal compound, the slow axis direction is determined by the orientation direction of the polymerizable liquid crystal compound.

When the quarter wavelength plate is a stretched film, the slow axis direction differs depending an the stretching method, and the slow axis and optical axis are determined on the basis of the stretching method such as uniaxial, biaxial or oblique stretching. A stretched film uniaxially stretched in the longitudinal direction is preferable since the stretched film is high in productivity and versatility.

It is preferable that the lamination of the patterned polarizing film and the quarter wavelength plate is carried out by sticking them with an adhesive agent.

The substrate or the orientation layer together with the substrate can be removed from the patterned polarizing film. For example, after a surface on which the patterned liquid crystal cured layer of the patterned polarizing film is formed and other component, such as the quarter wavelength plate are stuck with an adhesive agent, the substrate or the orientation layer together with the substrate of the patterned polarizing film may be also removed. In this case, the adhesive agent may be also applied to the patterned polarizing film or the other component. Preferably, an adhesive agent is applied to the patterned liquid crystal cured layer contained in the patterned polarizing film or the other component.

The patterned circular polarizing plate may also further comprise one or more selected from the group consisting of a retardation film having a half wavelength plate function (hereinafter, also referred to as "half wavelength plate") and a positive C film, and may also further comprise an anti-reflection layer, a luminance-improving film and a protective layer.

The protective layer serves to protect the liquid crystal cured layer from an external stimulus. A component forming the protective layer is a component which gives no damage for the liquid crystal cured layer as it formed, and the component preferably may be a (meth)acrylic resin, an epoxy resin, an urethane resin, an urea resin, a silicon resin, or a water-soluble polymer such as a polyvinyl alcohol. Each of them may be dissolved in a solvent in a form of a polymer and applied to the liquid crystal cured layer to form a protective layer, each of them may be dissolved in a solvent in form of a monomer and applied and then polymerized, or the monomer may be also directly applied and then polymerized.

The half wavelength plate usually has an optical property satisfying formula (60).

$$200 < Re(550) < 320 \tag{60}$$

Re(550) represents an in-plane retardation value for a light having wavelength of 550 nm.

The positive C film usually has an optical property satisfying formula (70). In the formula, in a refractive index ellipsoid formed by the positive C film, nx represents a principal refractive index in a direction parallel to a surface of the film. In a refractive index ellipsoid formed by the positive C film, ny represents a refractive index in a direction parallel to a surface of the film and perpendicular to nx direction. In a refractive index ellipsoid formed by the positive C film, nz represents a refractive index in a direction perpendicular to a surface of the film.

The half wavelength plate and positive C film may be also a coating layer formed by polymerizing a polymerizable liquid crystal compound, or a stretched film.

$$nx \approx ny < nz \tag{70}$$

Examples of the quarter wavelength plate, the half wavelength plate and the positive C film, which are formed by polymerizing a polymerizable liquid crystal compound, include the retardation films described in JP 2010-31223 A, JP 2010-270108 A, JP 2011-6360 A and JP 2011-207765 A.

Examples of the quarter wavelength plate as which is a stretched film include "PURE-ACE® WR" (manufactured by TEIJIN LIMITED).

Examples of the positive C film which is a stretched film include the stretched film described in JP 2008-129465 A, and a known multilayered extrusion film.

A patterned circular polarizing plate described in above is superior in an anti-reflection property. In the present invention, a superior anti-reflection property of patterned circular polarizing plate means that an anti-reflection property can be provided in a desired region. The patterned circular polarizing plate comprises a region having a high degree of reflection and a region having a low degree of reflection when a light in visible range is made incident to a reflection plate through the patterned circular polarizing plate to measure a degree of reflection. The region having the region (A) corresponds to the region having a high degree of reflection, and the region in which the region (B) is laminated corresponds to the region having a low degree of reflection.

An anti-reflection property can be provided in only a desired region in a display device by using a patterned circular polarizing plate having such a property.

An anti-reflection property can be evaluated not only by measuring the degree of reflection, but also by measuring an ellipticity at each wavelength. The ellipticity can be determined from a ratio of a short axis relative to a long axis in a polarization light cross-section of a circular polarization light. Specifically, the ellipticity in case of a complete circular polarization light is 100%, and the ellipticity in case of a linear polarization light is 0%. When the ellipticity at each wavelength is closer to 100%, a superior circular polarizing plate is obtained, and an anti-reflection property is superior. That is to say, when the ellipticity of the region having the region (A) is closer to 0% and the ellipticity of the region in which the region (B) is laminated is closer to 100%, a superior patterned circular polarizing plate is obtained.

In the patterned circular polarizing plate, a degree of reflection of the region having the region (A) is preferably 75% or higher, more preferably 80% or higher, and further preferably 85% or higher, provided that a degree of reflection, measured when a light is made incident to a reflection plate without the patterned circular polarizing plate, is regarded as 100%. In the same manner, a degree of reflection of the region in which the region (B) is laminated is preferably 15% or lower, more preferably 10% or lower, and further preferably 5% or lower.

In the patterned circular polarizing plate, the ellipticity for a light having wavelength of 450 nm of the region having the region (A) is preferably 20% or lower, and more preferably 5% or lower. In the same manner, the ellipticity for a light having wavelength of 550 nm is preferably 20% or lower, and more preferably 5% or lower. In the same manner, the ellipticity for a light having wavelength of 590 nm is preferably 20% or lower, and more preferably 5% or lower. In the same manner, the ellipticity for a light having wavelength of 630 nm is preferably 20% or lower, and more preferably 5% or lower.

In the patterned circular polarizing plate, the ellipticity of the region in which the region (B) is laminated is preferably 80% or higher, and more preferably 90% or higher. Particularly, in a neutral gray patterned polarizing film, the ellipticity for a light having wavelength of 450 nm is preferably 60% or higher, and more preferably 70% or higher. In the same manner, the ellipticity for a light having wavelength of 550 nm is preferably 80% or higher, and more preferably 90% or higher. In the same manner, the ellipticity for a light having wavelength of 590 nm is preferably 80% or higher, and more preferably 90% or higher. In the same manner, the ellipticity for a light having wavelength of 630 nm is preferably 60% or higher, and more preferably 70% or higher.

FIG. 4(a) to FIG. 4(h) represent cross-sectional diagrams of constructive examples of patterned circular polarizing plate 10.

Figure 4A:
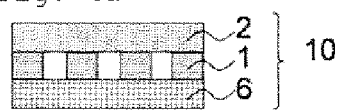
FIG. 4(a) to FIG. 4(h) are diagrams of the patterned circular polarizing plate.
Figure 4B:

FIG. 4(a) and FIG. 4(b) represent patterned circular polarizing plate 10 comprising patterned liquid crystal cured layer 1, substrate 2 and quarter wavelength plate 6.

Figure 4C:
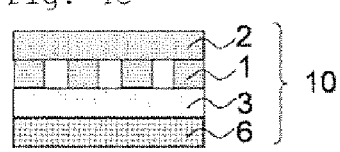
Figure 4D:
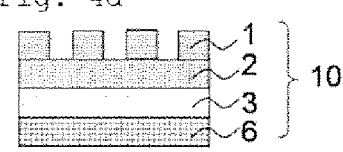

FIG. 4(c) and FIG. 4(d) represent patterned circular polarizing plate 10 comprising patterned liquid crystal cured layer 1, substrate 2, quarter wavelength plate 6 and half wavelength plate 3.

Figure 4E:
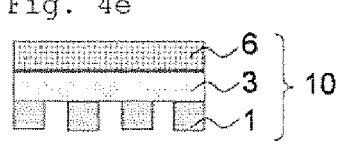

FIG. 4(e) represents patterned circular polarizing plate 10 comprising patterned liquid crystal cured layer 1, quarter wavelength plate 6 and half wavelength plate 3. This patterned circular polarizing plate can be obtained by using half wavelength plate 3 as a substrate and forming a patterned liquid crystal cured layer on its surface. In addition, this patterned circular polarizing plate can be also obtained by sticking a patterned liquid crystal cured layer contained in a patterned polarizing film to half wavelength plate 3, and then removing a substrate contained in the patterned polarizing film and laminating quarter wavelength plate 6.

Figure 4F:
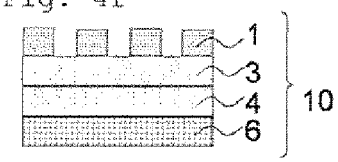
Figure 4G:
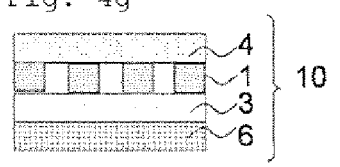
Figure 4H:
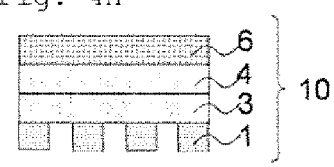

Each of FIG. 4(f) to FIG. 4(h) represents patterned circular polarizing plate 10 comprising patterned liquid crystal cured layer 1, quarter wavelength plate 6, half wavelength plate 3 and positive C film 4. These patterned circular polarizing plates can be produced by the same process as the process for producing the patterned circular polarizing plate shown in FIG. 4(e).

When a quarter wavelength plate and a half wavelength plate are laminated to obtain a patterned circular polarizing plate, it is preferable that the half wavelength plate is firstly laminated in such a way that its slow axis makes 75 degrees relative to an absorption axis of the patterned liquid crystal cured layer contained in the patterned polarizing film and the quarter wavelength plate is subsequently laminated in such a way that its slow axis makes 15 degrees.

Although the lamination order of the positive C film is not limited, it is necessary to laminate the patterned liquid crystal cured layer contained in the patterned polarizing film, the half wavelength plate and the quarter wavelength plate in order. By such a lamination, the obtained patterned circular polarizing plate tends to be superior in an antireflection property since the plate has an even polarization conversion property for a light having each wavelength in a visual light range.

The patterned polarizing film of the present invention and the patterned circular polarizing plate can be optionally cut for use in various display devices. The patterned polarizing film and the patterned circular polarizing plate are usually stuck to a display device via an adhesive agent or a pressure-sensitive adhesive agent.

The display device refers to a device comprising a display element, that is, a device comprising a luminescent element or device as a luminescent source. Examples of the display device comprising the patterned polarizing film or the patterned circular polarizing plate include a liquid crystal display device, an organic electroluminescence (EL) display device, an inorganic electroluminescence (EL) display device, an electron emission display device (such as a field emission display device (FED) and surface-conduction electron-emitter display (SED)), an electronic paper (a display device with an electronic ink or an electrophoresis element, a plasma display device, a projection type-display device (such as a grating light valve (GLV) display device, a display device comprising a digital micromirror device (DMD)) and a piezoceramic display. The liquid crystal display device may be a transmissive liquid crystal display, a semi-transmissive liquid crystal display, a reflective liquid crystal display, a direct viewing liquid crystal display or a projection liquid crystal display. These display devices may be also display devices displaying a two-dimensional image or stereoscopic display devices displaying a three-dimensional image. The patterned polarizing film and the patterned circular polarizing plate are particularly effectively used for display devices including an organic electroluminescence (EL) display device and an inorganic electroluminescence (EL) display device, and also display devices comprising a touch panel.

<Substrate>

The substrate may be also a glass substrate or a resin substrate, and is preferably a resin substrate. A thin patterned polarizing film can be obtained by using a film substrate made of a resin.

The resin substrate is preferably a transparent resin substrate. The transparent resin substrate refers to a substrate having translucency in which a light, in particular a visible light can be transmitted, and the translucency refers to a property in which a transmission of a light beam in wavelength of 380 to 780 nm is 80% or higher.

The substrate is preferably a quarter wavelength plate. The patterned circular polarizing plate can be obtained by using a quarter wavelength plate as the substrate without lamination of a patterned polarizing film and a quarter wavelength plate.

Preferable examples of the quarter wavelength plate for use as the substrate include the same quarter wavelength plates as described above.

In addition, the substrate may be also a half wavelength plate.

Examples of a resin constituting the substrate include polyolefins such as polyethylene, polypropylene, norbornene-based polymers; cycloolefin-based resins; polyvinyl alcohol; polyethylene terephthalate; polymethacrylic acid esters; polyacrylic acid esters; cellulosic esters such as triacetyl cellulose, diacetyl cellulose and cellulose acetate propionate; polyethylene naphthalate; polycarbonates; polysulfones; polyethersulfones; polyetherketones; polyphenylene sulfide; and polyphenylene oxide. Preferable are cellulosic esters, cycloolefin-based resins, polycarbonates, polyethersulfones, polyethylene terephthalate and polymethacrylic acid esters.

The cellulosic ester is cellulose whose hydroxyl groups are at least partly esterified, and is available in the market. In addition, a substrate comprising a cellulosic ester is also available in the market. Examples of a commercially available substrate comprising a cellulosic ester include Fujitac® film (Fujifilm Corporation), KC8UX2M (Konica Minolta Opto Co., Ltd.), KC8UY (Konica Minolta Opto Co., Ltd.) and KC4UY (Konica Minolta Opto Co., Ltd.).

The cycloolefin-based resin is a polymer of a cycloolefin such as norbornene or a polycyclic norbornene-based monomer, or the copolymer thereof. The cycloolefin-based resin may also comprise a ring-opening structure, and may be also a hydrogenated cycloolefin-based resin having a ring-opening structure. In addition, the cycloolefin-based resin may also comprise a structural unit derived from a chain olefin and a vinylated aromatic compound. A polar group may be also introduced into the cycloolefin-based resin.

Examples of the chain olefin include ethylene and propylene, and examples of the vinylated aromatic compound include styrene, α-methylstyrene and alkyl-substituted styrene.

When the cycloolefin-based resin is a copolymer of a cycloolefin and a chain olefin or vinylated aromatic compound, a content of a structural unit derived from the cycloolefin is usually 50 mole % or less and preferably from 15 to 50 mole %, based on the total structural units of the copolymer.

When the cycloolefin-based resin is a terpolymer of a cycloolefin, a chain olefin and a vinylated aromatic compound, a content of a structural unit derived from the chain olefin is usually from 5 to 80 mole % based on the total structural units of the copolymer, and a content ratio of a structural unit derived from the vinylated aromatic compound is usually from 5 to 80 mole % based on the total structural units of the copolymer. The terpolymer has an advantage that the used amount of the costly cycloolefin can be relatively decreased.

The cycloolefin-based resin is available in the market. Example of a commercially available cycloolefin-based resin include Topas® (Ticona GmbH in Germany), ARTON® (JSR Corporation), ZEONOR® (ZEON Corporation), ZEONEX® (ZEON Corporation) and APEL® (Mitsui Chemicals, Inc). A layer is formed from such a cycloolefin-based resin by known methods such as a solution casting method and a melt extrusion method, and can be as the substrate. Examples of a commercially available substrate comprising a cycloolefin-based resin include Esushina® (SEKISUI CHEMICAL CO., LTD.), SCA40® (SEKISUI CHEMICAL CO., LTD.), ZEONOR FILM® (Optes) and ARTON FILM® (JSR Corporation).

A surface treatment may be performed on the substrate. Examples of a method of the surface treatment include a method of treating a substrate surface using corona or plasma under vacuum to atmosphere pressure; a laser treatment method of a substrate surface; an ozone treatment method of a substrate surface; a saponification treatment method of a substrate surface; a flame treatment method of a substrate surface; a method of applying a coupling agent to a substrate surface; a primer treatment method of a substrate surface; and a graft polymerization method by exposure of radiation, corona or plasma after applying a reactive monomer or polymer to a substrate surface. Among them, the method of treating a substrate surface using corona or plasma under vacuum to atmosphere pressure is preferable.

Examples of the method of treating a substrate surface using corona or plasma under vacuum to atmosphere pressure include a method of treating a substrate surface by arranging the substrate between electrodes facing with each other and generating corona or plasma under a pressure close to atmosphere pressure; a method of flowing a gas between electrodes facing with each other, making the gas into plasma between the electrodes and applying the plasma-state gas to a substrate; and a method of treating a substrate surface by generating glow discharge plasma under a low pressure condition.

Among them, preferable is a method of treating a substrate surface by arranging the substrate between electrodes facing with each other and generating corona or plasma under a pressure close to atmosphere pressure, or a method of flowing a gas between electrodes facing with each other, making the gas into plasma between the electrodes and applying the plasma-state gas to a substrate. Such methods using corona or plasma are usually carried out by means of a commercially available surface treatment device.

The substrate may also comprise a protective film on a surface reverse to the surface on which the composition for forming a liquid crystal cured layer is applied. Examples of the protective film include a film such as polyethylene, polyethylene terephthalate, polycarbonates and polyolefins, and also a film additionally comprising an adhesive layer on the film. Among them, in view of a small thermal deformation in drying, polyethylene terephthalate is preferable. When the substrate comprises a protective film on a surface reverse to the surface on which the composition for forming a liquid crystal cured layer is applied, a shaking of the film and a slight vibration of the applied surface in conveying the substrate can be suppressed, and uniformity of a coating layer can be improved.

The thickness of the substrate is preferably thin in view that the substrate has such a weight to be practically handled. However, a too thin substrate tends to result in a reduced strength and to be inferior in workability. The thickness of the substrate is usually from 5 to 300 µm, and preferably from 20 to 200 µm.

The length of the substrate in the longitudinal direction is usually from 10 to 3000 m, and preferably from 100 to 2000 m. The length of the substrate in the short direction is usually from 0.1 to 5 m, and preferably from 0.2 to 2 m.

<Orientation Layer>

An orientation layer in the present invention is a layer having an orientation controlling force which orientates a polymerizable liquid crystal compound in a desired direction.

The orientation layer preferably has high solvent resistance in which the layer is not dissolved by application of the composition for a liquid crystal cured layer or the like, and has heat resistance in a heat treatment for removing solvents or for orienting a polymerizable liquid crystal compound. Examples of the orientation layer include an orientation layer comprising an anisotropic polymer, a photo-orientation layer, and a groove-orientation layer having an unevenness pattern or multiple grooves on its surface.

Examples of the anisotropic polymer include polyamides and gelatins having amide bonds in a molecule; polyimides having imide bonds in a molecule and polyamic acids which are the hydrolysate thereof; polyvinyl alcohol; alkyl-modified polyvinyl alcohols; polyacrylamide; polyoxazoles; polyethyleneimine; polystyrene; polyvinylpyrrolidone; polyacrylic acid; and polyacrylic acid esters. Among them, polyvinyl alcohol is preferable. It is also possible to combine two or more kinds of the anisotropic polymers.

The orientation layer comprising an anisotropic polymer is usually formed on a surface of a substrate by applying a composition in which an anisotropic polymer is dissolved in a solvent (hereinafter, also referred to as "anisotropic polymer composition") to a substrate, and removing the solvent, or by applying the anisotropic polymer composition to a substrate, removing the solvent and carrying out rubbing treatment (rubbing method).

Examples of the solvent include water; alcohol solvents such as methanol, ethanol, ethylene glycol, isopropyl alcohol, propylene glycol, methyl cellosolve, butyl cellosolve and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. It is also possible to use the solvent alone or to combine two or more kinds of the solvents.

The concentration of the anisotropic polymer in the anisotropic polymer composition should be in such a range that the anisotropic polymer completely dissolves in a solvent. The solid content of the anisotropic polymer is preferably from 0.1 to 20% by mass and more preferably appropriately from 0.1 to 10% by mass, relative to the anisotropic polymer composition.

A commercial available product of an orientation layer material may be also directly used as the anisotropic polymer composition. Examples of the commercially available product of an orientation layer material include SUNEVER® (manufactured by NISSAN CHEMICAL INDUSTRIES, LTD.) and OPTMER® (manufactured by JSR Corporation).

Examples of a method for applying the anisotropic polymer composition to a substrate include known methods such as application methods including spin coating method, extrusion method, gravure coating method, die coating method, slit coating method, bar coating method and applicator method, and also printing methods including flexo printing method. When the patterned polarizing film is produced by a Roll-to-Roll type continuous production method, gravure coating method, die coating method or a printing method such as flexo printing method is usually employed as the application method.

Examples of a method for removing the solvent contained in the anisotropic polymer composition include air drying, draught drying, heat drying and vacuum drying.

A rubbing treatment is optionally carried out in order to provide an orientation controlling force in an orientation layer (rubbing method). By selecting a rubbing direction, the direction of the orientation controlling force can be arbitrarily controlled.

Examples of a method for providing an orientation controlling force by a rubbing method include a method in which a layer of the anisotropic polymer, formed on the surface of the substrate by applying the anisotropic polymer composition on the substrate and annealing it, is brought into contact with a rolling rubbing roll wrapped with a rubbing cloth.

The photo-orientation layer can be usually formed on a substrate by applying a composition comprising a polymer or a monomer having a photoreactive group and a solvent (hereinafter, also referred to as "composition for forming a photo-orientation layer") to a substrate, and radiating a light (preferably polarization UV). The photo-orientation layer is preferable in view that the direction of the orientation controlling force can be arbitrarily controlled by selecting a polarization direction of the radiated light.

The photoreactive group refers to a group which generates a liquid crystal orientating force by light irradiation. Specific examples thereof include a group involved in a photoreaction as a source of the liquid crystal orientating force such as orientation-induced reaction of a molecule generated by light radiation, isomerization reaction, dimerization reaction, photocrosslinking reaction or photodegradation reaction. Among them, a group involved in dimerization reaction or photocrosslinking reaction is preferable in view of superior orientation. The photoreactive group is preferably a group having an unsaturated group, in particular a double bond, and particularly preferably a group having at least one selected from the group consisting of a carbon-carbon double bond (C=C bond), a carbon-nitrogen double bond (C=N bond), a nitrogen-nitrogen double bond (N=N bond) and a carbon-oxygen double bond (C=O bond).

Examples of the photoreactive group having a C=C bond include a vinyl group, a polyene group, a stilbene group, a stilbazole group, a stilbazolium group, a chalcone group and a cinnamoyl group. Examples of the photoreactive group having a C=N group include a group having a structure of an aromatic Schiff base, an aromatic hydrazone or the like. Examples of the photoreactive group having a N=N bond include an azobenzene group, an azonaphthalene group, an aromatic heterocyclic azo group, an azobis group, formazan group and a group having an azoxybenzene structure. Examples of the photoreactive group having a C=O bond include a benzophenone group, a coumalin group, an anthraquinone group and a maleimide group. These groups may also have a substituent group such as an alkyl group, an alkoxy group, an aryl group, an allyloxy group, a cyano group, an alkoxycarbonyl group, a hydroxyl group, a sulfonate group or a halogenated alkyl group.

Among them, a group involved in photodimerization reaction is preferable, and in view that a radiating amount of a polarization light required for photo-orientation is relatively low and that a photo-orientation layer having thermal and temporal stabilities is easily obtained, a cinnamoyl group and a chalcone group are preferable. The polymer having a photoreative group particularly preferably has a cinnamoyl group such that a terminal part of a side chain of the polymer has a cinnamic acid structure.

Examples of the solvent contained in the composition for forming a photo-orientation layer include the same solvents as those contained in the above anisotropic polymer composition, and the solvent can be selected depending on a solubility of the polymer or monomer having a photoreactive group.

The content of the polymer or monomer having a photoreactive group in the composition for forming a photo-orientation layer can be arbitrarily adjusted depending on the type of the polymer or monomer and the targeted thickness of the photo-orientation layer. The content is preferably at least 0.2% by mass, and more preferably in a range of 0.3 to 10% by mass. Unless the properties of the photo-orientation layer are remarkably impaired, the composition for forming a photo-orientation layer may also comprise a polymer material such as polyvinyl alcohol or a polyimide and a photosensitizer.

Examples of a method for applying the composition for forming a photo-orientation layer to a substrate include the same methods as the methods for applying the anisotropic polymer composition to a substrate. Examples of a method for removing a solvent from the applied composition for forming a photo-orientation layer include the same methods as the methods for removing a solvent from the anisotropic polymer composition.

In radiating a polarization light, it is possible either to radiate polarization UV directly to the composition for forming a photo-orientation layer, which is applied on a substrate, after a solvent is removed, or to radiate a polarization light through a substrate by radiating the polarization light from a side of the substrate. The polarization light is particularly preferably a substantially parallel light. The wavelength of the radiated polarization light is preferably in such a wavelength range that the polymer or monomer having a photoreactive group may incorporate optical energy. Specially, UV (ultraviolet ray) in a wavelength range of 250 to 400 nm is particularly preferable. Examples of a light source for radiating the polarization light include a xenon lamp, a high-pressure mercury lamp, an extra high-pressure mercury lamp, a metal halide lamp, ultraviolet laser such as KrF and ArF, and the like. A high-pressure mercury lamp, an extra high-pressure mercury lamp and a metal halide lamp are more preferable. These lamps are preferable since an emission intensity of ultraviolet ray at wavelength of 313 nm is high. Polarization UV can be radiated by radiating a light from the light source through a suitable polarizer. Examples of the polarizer include a polarization prism such as a polarized filter, a Glan-Thomson and a Glan-Taylor, and also a wire grid-type polarizer.

In carrying out rubbing treatment or radiating a polarization light, it is also possible to form multiple regions (patterns) with different liquid crystal orientation directions by a masking treatment.

A groove-orientation layer is a layer having an orientating force by an unevenness pattern or multiple grooves on its surface. H. V. Quesnel at el has reported that when a liquid crystal molecule is arranged on a substrate having multiple liner grooves at equal intervals, the liquid crystal molecule is orientated in the direction along the grooves (Physical Review, A24(5), p. 2713, 1981).

Specific examples of a method for forming the groove-orientation layer on a substrate surface include a method in which after exposure on a surface of a photoreactive polyimide through an exposure mask having a slit in a periodically patterned form, development and rinsing treatments are carried out and an unnecessary polyimide layer is removed to form an evenness pattern; a method in which a UV cured resin layer is formed on a plate-shaped base board having grooves on its surface, and the resin layer is transmitted onto a substrate film and then cured; a method in which a substrate film, in which a UV cured resin layer is formed, is conveyed and a roll-shaped base board having multiple grooves is pressed onto the surface of the UV cured resin layer to form unevenness and then cured; and the like. Specific examples of the methods include the methods described in JP 06-34976 A, JP 2011-242743 A and the like.

Among the above-mentioned methods, preferable is a method in which a roll-shaped base board having multiple grooves is pressed onto the surface of the UV cured resin layer to form unevenness and then cured. Stainless (SUS) steel can be used as the roll-shaped base board in view of durability.

As the UV cured resin, a polymer of a monofunctional acrylate, a polymer of a polyfunctional acrylate and a polymer of the mixture thereof can be used.

The monofunctional acrylate is a compound having one group selected from the group consisting of an acryloyloxy group ($CH_2$=CH—COO—) and a methacryloyloxy group ($CH_2$=C($CH_3$)—COO—) (hereinafter, also referred to as "(meth)acryloyloxy group") in a molecule.

Examples of the monofunctional acrylate having one (meth)acryloyloxy group include an alkyl(meth)acrylate having 4 to 16 carbon atoms, a β-carboxyalkyl(meth)acrylate having 2 to 14 carbon atoms, an alkylated phenyl(meth)acrylate having 2 to 14 carbon atoms, methoxypolyethylene glycol(meth)acrylate, phenoxypolyethylene glycol(meth)acrylate and isobonyl(meth)acrylate.

The polyfunctional acrylate is usually a compound having 2 to 6 (meth)acryloyloxy groups in a molecule.

Examples of the difunctional acrylate having two (meth)acryloyloxy groups include 1,3-butanediol di(meth)acrylate; 1,6-hexanediol di(meth)acrylate; ethylene glycol di(meth)acrylate; diethylene glycol di(meth)acrylate; neopentyl glycol di(meth)acrylate; triethylene glycol di(meth)acrylate; tetraethylene glycol di(meth)acrylate; polyethylene glycol diacrylate; bis(acryloyloxyethyl)ether of bisphenol A; ethoxylated bisphenol A di(meth)acrylate; propoxylated neopentyl glycol di(meth)acrylate; ethoxylated neopentyl glycol di(meth)acrylate, and 3-methylpentanediol di(meth)acrylate.

Examples of the polyfunctional acrylate having 3 to 6 (meth)acryloyloxy groups include trimethylolpropane tri(meth)acrylate; pentaerythritol tri(meth)acrylate; tris(2-hydroxyethyl)isocyanurate tri(meth)acrylate; ethoxylated trimethylolpropane tri(meth)acrylate; propoxylated trimethylolpropane tri(meth)acrylate; pentaerythritol tetra(meth)acrylate; dipentaerythritol penta(meth)acrylate; dipentaerythritol hexa(meth)acrylate; tripentaerythritol tetra(meth)acrylate; tripentaerythritol penta(meth)acrylate; tripentaerythritol hexa(meth)acrylate; tripentaerythritol hepta(meth)acrylate; tripentaerythritol octa(meth)acrylate; a reaction product of pentaerythritol tri(meth)acrylate with an acid anhydride; a reaction product of dipentaerythritol penta(meth)acrylate with an acid anhydride; a reaction product of tripentaerythritol hepta(meth)acrylate with an acid anhydride; caprolactone-modified trimethylolpropane tri(meth)acrylate; caprolactone-modified pentaerythritol tri(meth)acrylate; caprolactone-modified tris(2-hydroxyethyl) isocyanurate tri(meth)acrylate; caprolactone-modified pentaerythritol tetra(meth)acrylate; caprolactone-modified dipentaerythritol penta(meth)acrylate; caprolactone-modified dipentaerythritol hexa(meth)acrylate; caprolactone-modified tripentaerythritol tetra(meth)acrylate; caprolactone-modified tripentaerythritol penta(meth)acrylate; caprolactone-modified tripentaerythritol hexa(meth)acrylate; caprolactone-modified tripentaerythritol hepta(meth)acrylate; caprolactone-modified tripentaerythritol octa(meth)acrylate; a reaction product of caprolactone-modified pentaerythritol tri(meth)acrylate with an acid anhydride; a reaction product of caprolactone-modified dipentaerythritol penta(meth)acrylate with an acid anhydride; and a reaction product of caprolactone-modified tripentaerythritol hepta(meth)acrylate with an acid anhydride. In the specific examples of the polyfunctional acrylate described here, the "(meth)acrylalte" refers to a acrylate or a methacrylate. The "caprolactone-modified" refers to that a ring-opened body or a ring-opened polymer of caprolactone is introduced between an alcohol-derived moiety and a (meth)acryloyloxy group of a (meth)acrylate compound.

As the polyfunctional acrylate, a commercial available product can be also used. Examples of the commercially available product include A-DOD-N, A-HD-N, A-NOD-N, APG-100, APG-200, APG-400, A-GLY-9E, A-GLY-20E, A-TMN-3, A-TMPT, AD-TMP, ATM-35E, A-TMMT, A-9550, A-DPH, HD-N, NOD-N, NPG and TMPT (manufactured by Shin-Nakamura Chemical Co., Ltd.); ARONIX M-220, M-325, M-240, M-270, M-309, M-310, M-321, M-350, M-360, M-305, M-306, M-450, M-451, M-408, M-400, M-402, M-403, M-404, M-405 and M-406 (manufactured by Toagosei Co., Ltd.); EBECRYL 11, 145, 150, 40, 140 and 180, DPGDA, HDDA, TPGDA, HPNDA, PETIA, PETRA, TMPTA, TMPEOTA, DPHA and EBECRYL series (manufactured by Daicel-Cytec).

As the evenness of the groove-orientation layer, the width of the protrusion is preferably from 0.05 to 5 μm, the width of the recess is preferably from 0.1 to 5 μm, and the gap depth of the evenness is preferably 2 μm or less and more preferably from 0.01 to 1 μm. Within the range, a liquid crystal orientation with little orientation disturbance can be obtained.

The thickness of the orientation layer is usually from 10 nm to 10000 nm, preferably from 10 nm to 1000 nm, and more preferably from 10 nm to 500 nm.

<Polymerizable Liquid Crystal Compound>

The polymerizable liquid crystal compound is compound comprising a polymerizable group and having liquid crystallinity.

The polymerizable group refers to a group involved in a polymerization reaction, and is preferably a photo-polymerizable group. The photo-polymerizable group refers to a group which may be involved in a polymerization reaction by an active radical generated from an after-mentioned photo-polymerization initiator, an acid or the like. Examples of the polymerizable group include a vinyl group, a vinyloxy group, 1-chlorovinyl group, isopropenyl group, 4-vinyl phenyl group, acryloyloxy group, methacryloyloxy group, oxiranyl group and oxetanyl group. Among them, acryloyloxy group, methacryloyloxy group, a vinyloxy group, oxiranyl group and oxetanyl group are preferable, and acryloyloxy group is more preferable. The liquid crystallinity may be also thermotropic liquid crystallinity or lyotropic liquid crystallinity, and the phase order structure in the thermotropic liquid crystallinity may be also nematic liquid crystal or smectic liquid crystal.

The polymerizable liquid crystal compound is preferably a smectic liquid crystal compound and more preferably a higher order smectic liquid crystal compound, in view that a higher polarizing property is obtained. Among them, preferable is a higher order smectic liquid crystal compound which forms smectic B phase, smectic D phase, smectic E phase, smectic F phase, smectic G phase, smectic H phase, smectic I phase, smectic J phase, smectic K phase or smectic L phase, and more preferable is a higher order smectic liquid crystal compound which forms smectic B phase, smectic F phase or smectic I phase. When the liquid crystal phase formed by the polymerizable liquid crystal compound is in a higher order smectic phase, a liquid crystal cured layer having a higher degree of orientation order can be produced, and a high degree of polarization can be obtained. Such a liquid crystal cured layer having a higher degree of orientation order is a layer in which a Bragg peak derived from a higher order structure such as a hexatic phase or a crystal phase is obtained in X-ray diffraction measurement. The Bragg peak is a peak derived from a periodic structure of molecule orientation, and a layer in which the periodic interval is from 3.0 to 6.0 Åcan be obtained. Examples of the compound include the compound represented by the following formula (1) (hereinafter, also referred to as compound (1)). It is possible to use the polymerizable liquid crystal compound alone or to combine two or more kinds of the polymerizable liquid crystal compounds.

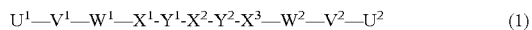
(1)

In formula (1);

$X^1$, $X^2$ and $X^3$ each independently represent 1,4-phenylene group optionally having a substituent or cyclohexane-1,4-diyl group optionally having a substituent. At least one of $X^1$, $X^2$ and $X^3$ is 1,4-phenylene group optionally having a substituent. —$CH_2$— constituting cyclohexane-1,4-diyl group may be also substituted with —O—, —S— or —NR—. R represents an alkyl group having 1 to 6 carbon atoms or a phenyl group, $Y^1$ and $Y^2$ each independently represent —$CH_2CH_2$—, —$CH_2O$—, —COO—, —OCOO—, a single bond, —N=N—, —$CR^a$=$CR^b$—, —C≡C— or —$CR^a$=N—. $R^a$ and $R^b$ each independently represent a hydrogen atom or an alkyl group having 1 to 4 carbon atoms, $U^1$ and $U^2$ represent a hydrogen atom or a polymerizable group, and at least one of them is a polymerizable group, $W^1$ and $W^2$ each independently represent a single bond, —O—, —S—, —COO— or —OCOO—, and $V^1$ and $V^2$ each independently represent an alkanediyl group having 1 to 20 carbon atoms and optionally having a substituent, and —$CH_2$— constituting the alkanediyl group may be also substituted with —O—, —S— or —NR—.

In compound (1), at least one of $X^1$, $X^2$ and $X^3$ is preferably 1,4-phenylene group optionally having a substituent.

The 1,4-phenylene group optionally having a substituent is preferably non-substituted. The cyclohexane-1,4-diyl group optionally having a substituent is preferably trans-cyclohexane-1,4-diyl group optionally having a substituent, and the trans-cyclohexane-1,4-diyl group optionally having a substituent is preferably non-substituted.

Examples of the substituent, which the 1,4-phenylene group optionally having a substituent or the cyclohexane-1,4-diyl group optionally having a substituent may optionally has, include an alkyl group having 1 to 4 carbon atoms such as methyl group, ethyl group and butyl group, cyano group, and a halogen atom.

$Y^1$ is preferably —$CH_2CH_2$—, —COO— or a single bond, and $Y^2$ is preferably —$CH_2CH_2$— or —$CH_2O$—.

$U^2$ is a hydrogen atom or a polymerizable group. $U^1$ is a hydrogen atom or a polymerizable group, and preferably a polymerizable group. Both $U^1$ and $U^2$ are preferably polymerizable groups, and preferably photo-polymerizable groups. A polymerizable liquid crystal compound having a photo-polymerizable group has an advantage that it can polymerize under a lower temperature condition.

The polymerizable groups represented by $U^1$ and $U^2$ may be different from each other, and are preferably identical to each other. Examples of the polymerizable group include a vinyl group, a vinyloxy group, 1-chlorovinyl group, isopropenyl group, 4-vinylphenyl group, acryloyloxy group, methacryloyloxy group, oxiranyl group and oxetanyl group. Among them, acryloyloxy group, methacryloyloxy group, a vinyloxy group, oxiranyl group and oxetanyl group are preferable, and acryloyloxy group is more preferable.

Examples of the alkanediyl groups represented by $V^1$ and $V^2$ include methylene group, ethylene group, propane-1,3-diyl group, butane-1,3-diyl group, butane-1,4-diyl group, pentane-1,5-diyl group, hexane-1,6-diyl group, heptane-1,7-diyl group, octane-1,8-diyl group, decane-1,10-diyl group, tetradecane-1,14-diyl group and icosane-1,20-diyl. $V^1$ and $V^2$ are preferably alkanediyl groups having 2 to 12 carbon atoms, and more preferably alkanediyl groups having 6 to 12 carbon atoms.

Examples of the substituent, which the alkanediyl group having 1 to 20 carbon atoms and optionally having a substituent optionally has, include cyano group and a halogen atom, and the alkanediyl group is preferably a non-substituted alkanediyl group, and more preferably a non-substituted and linear alkanediyl group.

Preferably, $W^1$ and $W^2$ each independently represent a single bond or —O—.

Specific examples of compound (1) include the compounds represented by formula (1-1) to formula (1-23). When compound (1) has cyclohexane-1,4-diyl group, the cyclohexane-1,4-diyl group is preferably a trans-body.

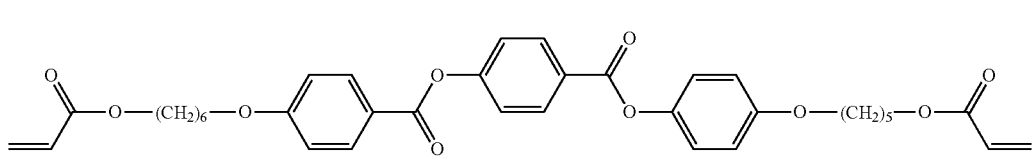
(1-1)

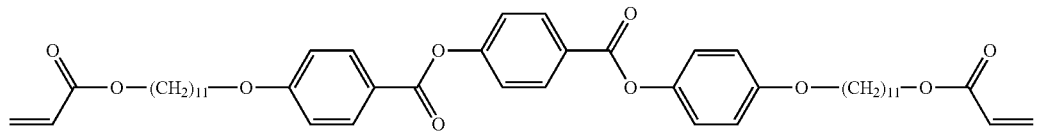
(1-2)
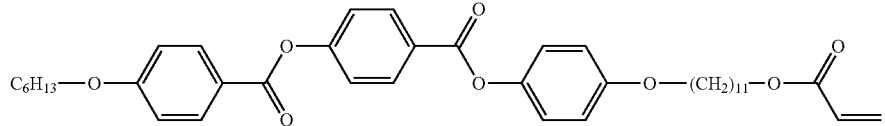
(1-3)
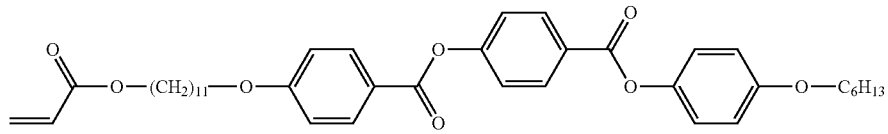
(1-4)
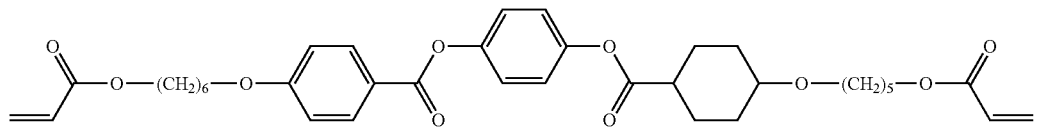
(1-5)
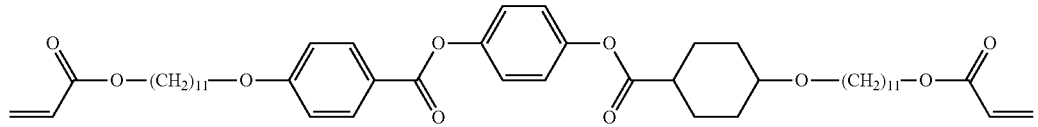
(1-6)
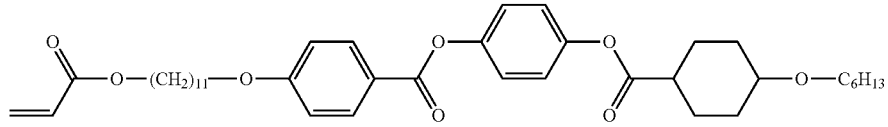
(1-7)
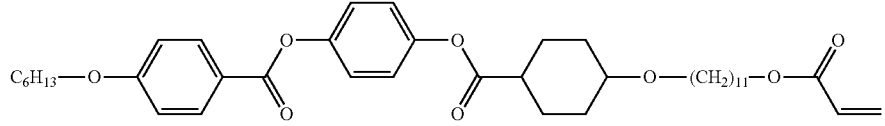
(1-8)
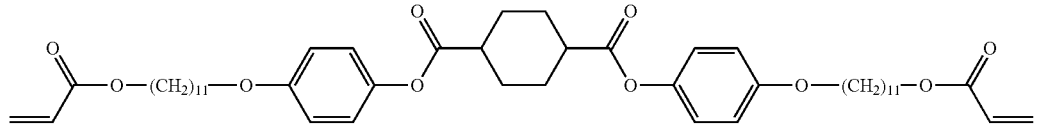
(1-9)
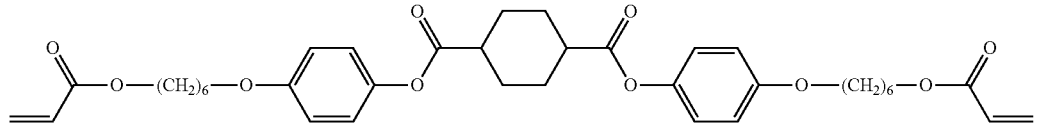
(1-10)
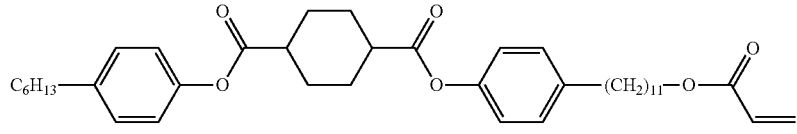
(1-11)
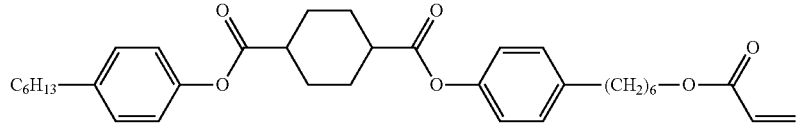
(1-12)

(1-13)
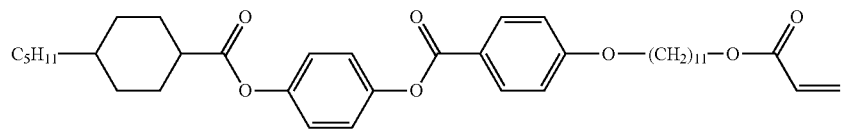
(1-14)
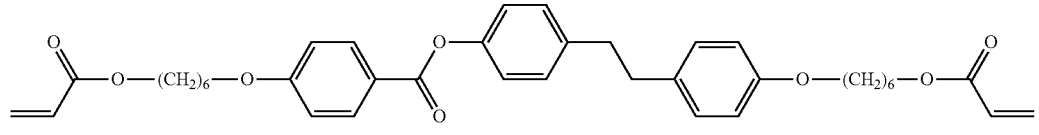
(1-15)
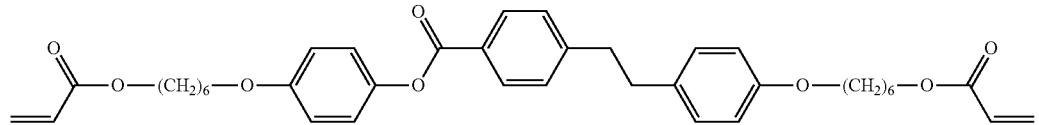
(1-16)
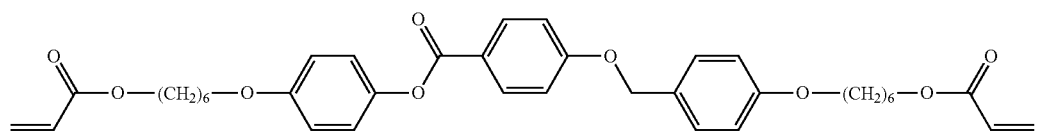
(1-17)
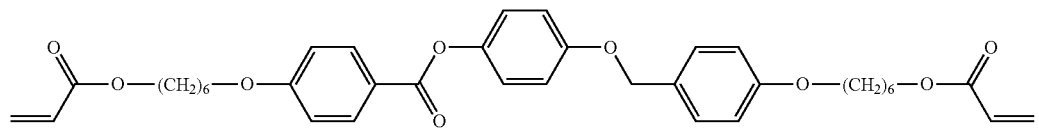
(1-18)
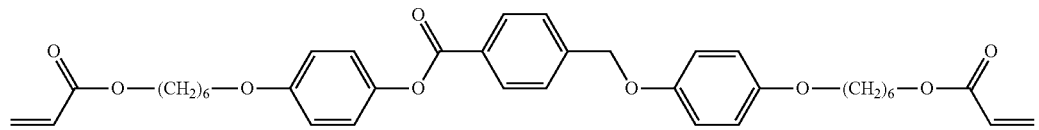
(1-19)
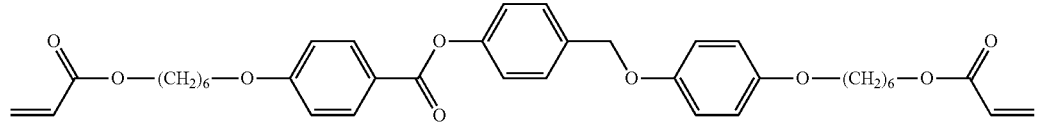
(1-20)
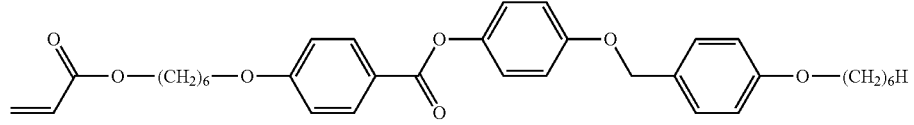
(1-21)
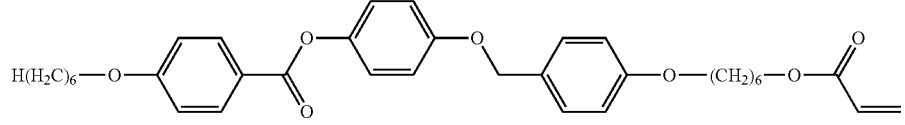
(1-22)
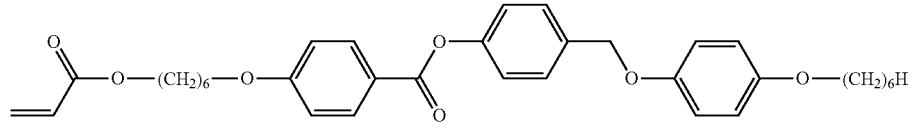
(1-23)
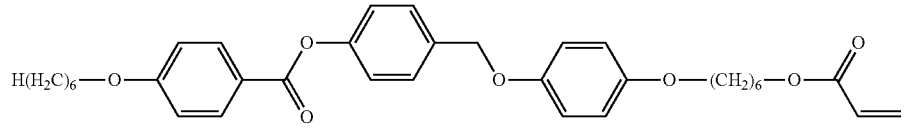

Among the compounds illustrated as compounds (1), preferable is at least one selected from the group consisting of the compounds represented by each formula (1-2), formula (1-3), formula (1-4), formula (1-6), formula (1-7), formula (1-8), formula (1-13) and formula (1-14), formula (1-15).

It is possible to use the compounds illustrated as compounds (1) alone or to combine two or more kinds of the compounds illustrated as compounds (1), as the composition for forming a liquid crystal cured layer. When two or more of polymerizable liquid crystal compounds are combined, at least one of them is preferably compound (1), and two or more of them are more preferably compounds (1). There are some cases where a liquid crystallinity can be temporarily maintained even at a temperature lower than or equal to a liquid crystal-crystal phase transition temperature by such a combination. When two or more of polymerizable liquid crystal compounds are combined, the combination ratio is usually from 1:99 to 50:50, preferably from 5:95 to 50:50, and more preferably from 10:90 to 50:50.

For example, the polymerizable liquid crystal compound can be produced by a known method described in Lub at al Recl. Tray. Chim. Pays-Bas, 115, 321-328(1996) and JP 4719156 B.

The content ratio of the polymerizable liquid crystal compound in the composition for forming a liquid crystal cured layer is usually from 70 to 99.5 parts by mass, preferably from 80 to 99 parts by mass, more preferably from 80 to 94 parts by mass, and further preferably from 80 to 90 parts by mass, relative to 100 parts by mass of the solid content of the composition for forming a liquid crystal cured layer, in view that orientation of the polymerizable liquid crystal compound increases. In the present specification, the solid content refers to the total amount of the components in the composition for forming a liquid crystal cured layer excluding a solvent.

The composition for forming a liquid crystal cured layer comprises a dichroic dye, and preferably comprises a polymerization initiator and a solvent. In addition, the composition may also comprise a sensitizer, a polymerization inhibitor, a leveling agent, a polymerizable non-liquid crystal compound and the like.

<Dichroic Dye>

The dichroic dye refers to a dye having such a property that an absorbance in a long axis direction of a molecule is different from an absorbance in a short axis direction.

The dichroic dye preferably has an absorption maximum wavelength (λMAX) in a range of 300 to 700 nm. Examples of the dichroic dye include acridine dye, oxazine dye, cyanine dye, naphthalene dye, azo dye and anthraquinone dye. Among them, azo dye is preferable. Examples of azo dye include monoazo dye, bisazo dye, trisazo dye, tetrakisazo dye and stilbene azo dye, and preferable are bisazo dye and trisazo dye. It is also possible to use the dichroic dye alone or to combine two or more kinds of the dichroic dyes. When polarizing performance over all ranges of visible lights is needed, it is preferable to combine three or more. Particularly in this case, it is preferable to combine three or more of azo compounds.

Examples of the azo dye include the compounds represented by formula (2) (hereinafter, also referred to as "compound (2)").

In formula (2), $A^1$ and $A^3$ each independently represent phenyl group optionally having a substituent, naphthyl group optionally having a substituent or a monovalent heterocyclic group optionally having a substituent. $A^2$ represents 1,4-phenylene group optionally having a substituent, naphthalene-1,4-diyl group optionally having a substituent or a divalent heterocyclic group optionally having a substituent. p represents an integer of 1 to 4. When p is an integer of two or higher, more than one of $A^2$ may be each independently identical to or different from each other.

Examples of the monovalent heterocyclic group include a group obtained by removing one hydrogen atom from the above-mentioned heterocyclic compound such as quinoline, thiazole, benzothiazole, thienothiazole, imidazole, benzoimidazole, oxazole and benzoxazole. Examples of the divalent heterocyclic group include a group obtained by removing two hydrogen atoms from the above-mentioned heterocyclic compound.

Examples of the substituent, which phenyl group, naphthyl group and the monovalent heterocyclic in $A^1$ and $A^3$ and also p-phenyl group, naphthalene-1,4-diyl group and the divalent heterocyclic group in $A^2$ may optionally have, include an alkyl group having 1 to 4 carbon atoms; an alkoxy group having 1 to 4 carbon atoms such as methoxy group, ethoxy group and butoxy group; a fluorated alkyl group having 1 to 4 carbon atoms such as trifluoromethyl group; cyano group; nitro group; a hydrogen atom; a substituted or non-substituted amino group such as amino group, diethyl amino group and pyrrolidino group (the substituted amino group refers to an amino group having one or two alkyl groups having 1 to 6 carbon atoms, or an amino group in which two substituted alkyl groups are combined to each other to form an alkanediyl group having 2 to 8 carbon atoms. The non-substituted amino group is —$NH_2$.). Specific examples of the alkyl group having 1 to 6 carbon atoms include the same groups as those illustrated as the groups which phenylene group or the like in compound (1) optionally has.

Among compounds (2), preferable are the compounds each represented by the following formula (2-1) to formula (2-6).

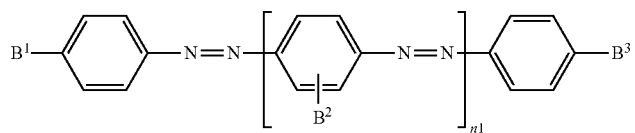

(2-1)

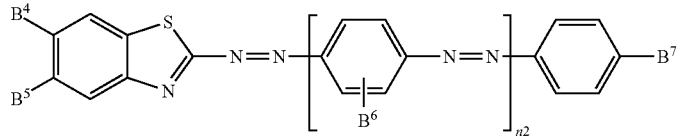

(2-2)

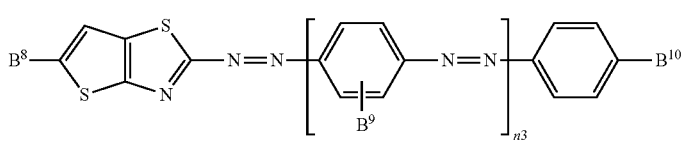
(2-3)

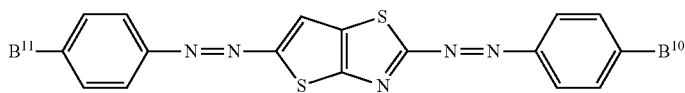
(2-4)

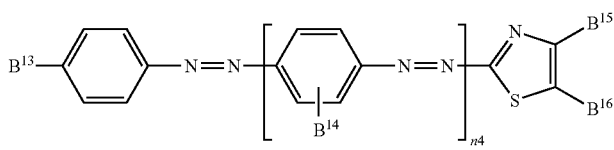
(2-5)

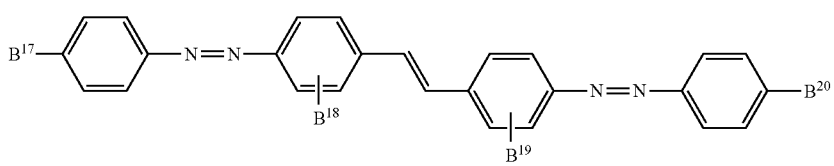
(2-6)

In formula (2-1) to formula (2-6), $B^1$ to $B^{20}$ each independently represent a hydrogen atom, an alkyl group having 1 to 6 carbon atoms, an alkoxy group having 1 to 4 carbon atoms, cyano group, nitro group, a substituted or non-substituted amino group (the substituted amino group and the non-substituted amino group are defined above), a chlorine atom or trifluoromethyl group.

n1 to n4 each independently represent an integer of 0 to 3.

When n1 is 2 or higher, more than one of $B^2$ may be each independently identical to or different from each other, when n2 is 2 or higher, more than one of $B^6$ may be each independently identical to or different from each other, when n3 is 2 or higher, more than one of $B^9$ may be each independently identical to or different from each other, and when n4 is 2 or higher, more than one of $B^{14}$ may be each independently identical to or different from each other.

The anthraquinone dye is preferably a compound represented by formula (2-7).

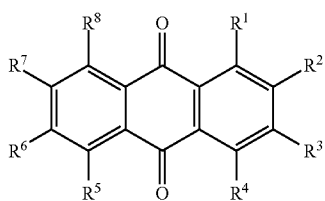
(2-7)

In formula (2-7), $R^1$ to $R^8$ each independently represent a hydrogen atom, $-R^X$, $-NH_2$, $-NHR^X$, $-NR^X_2$, $-SR^X$ or a halogen atom.

$R^X$ represents an alkyl group having 1 to 4 carbon atoms or an aryl group having 6 to 12 carbon atoms.

The oxazine dye is preferably a compound represented by formula (2-8).

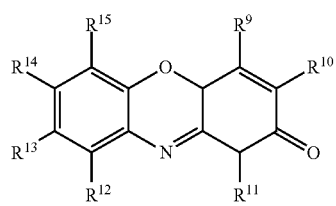
(2-8)

In formula (2-8), $R^9$ to $R^{15}$ each independently represent a hydrogen atom, $-R^X$, $-NH_2$, $-NHR^X$, $-NR^X_2$, $-SR^X$ or a halogen atom.

$R^X$ represents an alkyl group having 1 to 4 carbon atoms or an aryl group having 6 to 12 carbon atoms.

The acridine dye is preferably a compound represented by formula (2-9).

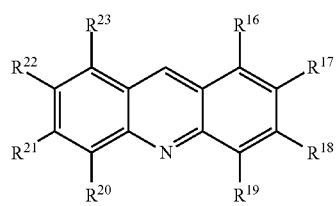
(2-9)

In formula (2-9), $R^{16}$ to $R^{23}$ each independently represent a hydrogen atom, $-R^X$, $-NH_2$, $-NHR^X$, $-NR^X_2$, $-SR^X$ or a halogen atom.

$R^X$ represents an alkyl group having 1 to 4 carbon atoms or an aryl group having 6 to 12 carbon atoms.

Examples of the alkyl group having 1 to 4 carbon atoms represented by $R^X$ in formula (2-7), formula (2-8) and formula (2-9) include methyl group, ethyl group, propyl group, butyl group, pentyl group and hexyl group, and examples of the aryl group having 6 to 12 carbon atoms include phenyl group, toluyl group, xylyl group and naphthyl group.

The cyanine dye is preferably a compound represented by formula (2-10) or formula (2-11).

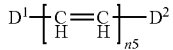
(2-10)

In formula (2-10), $D^1$ and $D^2$ each independently represent a group represented by any one of formula (2-10a) to formula (2-10d).

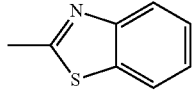
(2-10a)

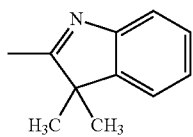
(2-10b)

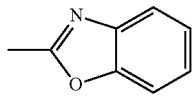
(2-10c)

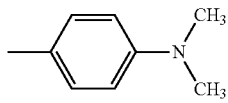
(2-10d)

n5 represents an integer of 1 to 3.

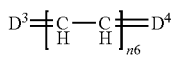
(2-11)

In formula (2-11), $D^3$ and $D^4$ each independently represent a group represented by any one of formula (2-11a) to formula (2-11h).

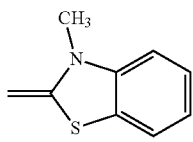
(2-11a)

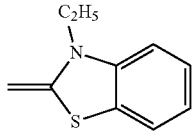
(2-11b)

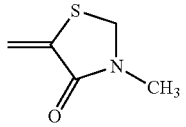
(2-11c)

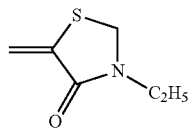
(2-11d)

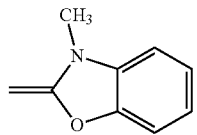
(2-11e)

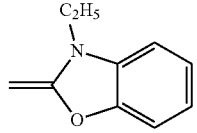
(2-11f)

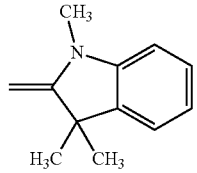
(2-11g)

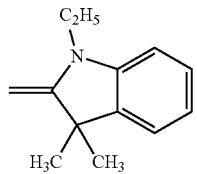
(2-11h)

n6 represents an integer of 1 to 3.

The content of the dichroic dye in the composition for forming a liquid crystal cured layer is preferably 0.1 parts by mass or more and 30 parts by mass or less, more preferably 0.1 parts by mass or more and 20 parts by mass or less, further preferably 0.1 parts by mass or more and 10 parts by mass or less, and particularly preferably 0.1 parts by mass or more and 5 parts by mass or less, relative to 100 parts by mass of the solid content of the composition for forming a liquid crystal cured layer, in view that good orientation of the dichroic dye is obtained. The content of the dichroic dye is preferably within this range, since a liquid crystal orientation of the polymerizable liquid crystal compound is difficult to disturb.

<Polymerization Initiator>

The polymerization initiator is a compound which may initiate a polymerization reaction of the polymerizable liquid crystal compound or the like. The polymerization initiator is preferably a photo-polymerization initiator which generates an active radical due to light.

Examples of the polymerization initiator include a benzoin compound, a benzophenone compound, an alkylphenone compound, an acylphosphine oxide compound, a triazine compound, an iodonium salt and sulfonium salt.

Examples of the benzoin compound include benzoin, benzoin methyl ether, benzoin ethyl ether, benzoin isopropyl ether and benzoin isobutyl ether.

Examples of the benzophenone compound include benzophenone, methyl o-benzoylbenzoate, 4-phenyl benzophenone, 4-benzoyl-4'-methyldiphenyl sulfide, 3,3',4,4'-tetra(tert-butyl peroxycarbonyl)benzophenone and 2,4,6-trimethyl benzophenone.

Examples of the alkylphenone compound include diethoxyacetophenone, 2-methyl-2-morpholino-1-(4-methylthiophenyl)propan-1-one, 2-benzyl-2-dimethylamino-1-(4-morpholinophenyl)butan-1-one, 2-hydroxy-2-methyl-1-phenylpropan-1-one, 1,2-diphenyl-2,2-dimethoxyethan-1-one, 2-hydroxy-2-methyl-1-[4-(2-hydroxyethoxyl)phenyl]propan-1-one, 1-hydroxycyclohexylphenylketone and an oligomer of 2-hydroxy-2-methyl-1-[4-(1-methylvinyl)phenyl]propan-1-one.

Examples of the acylphosphine oxide compound include 2,4,6-trimethylbenzoyldiphenylphosphine oxide and bis(2,4,6-trimethylbenzoyl)phenylphosphine oxide.

Examples of the triazine compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine and 2,4-bis(trichloromethyl)-6-[2-(3,4-dimethoxyphenyl)ethenyl]-1,3,5-triazine, A commercial available product can be used as the polymerization initiator. Examples of the commercial available product include Irgacure® 907, Irgacure® 184, Irgacure® 651, Irgacure® 819, Irgacure® 250, and Irgacure® 369 (Ciba Japan); SEIKUOL® BZ, SEIKUOL® Z, and SEIKUOL® BEE (Seiko Chemical Co., Ltd); kayacure® BP100, and kayacure® UVI-6992 (Dow); Adekaoptomer® SP-152, and Adekaoptomere® SP-170 (ADEKA Corporation); TAZ-A, and TAZ-PP (Nihon Siber Hegner); and TAZ-104 (SANWA Chemical).

The content of the polymerization inhibitor is usually from 0.1 to 30 parts by mass, preferably from 0.5 to 10 parts by mass, and more preferably from 0.5 to 8 parts by mass, relative to 100 parts by mass of the content of the polymerizable liquid crystal compound, in view that a liquid crystal orientation of the polymerizable liquid crystal compound is difficult to disturb.

<Solvent>

The solvent is preferably a solvent which can completely dissolve the polymerizable liquid crystal compound and the dichroic dye, and additionally, preferable is a solvent which is inert to a polymerization reaction of the polymerizable liquid crystal compound.

Examples of the solvent include alcohol solvents such as methanol, ethanol, ethylene glycol, isopropyl alcohol, propylene glycol, ethylene glycol methyl ether, ethylene glycol butyl ether and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, 2-heptanone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorine-containing solvents such as chloroform and chlorobenzene. It is also possible to use the solvent alone or to combine two or more of the solvents.

The content of the solvent is preferably from 50 to 98% by mass, relative to the total amount of the composition for forming a liquid crystal cured layer. In other words, the solid content in the composition for forming a liquid crystal cured layer is preferably from 2 to 50% by mass. When the solid content is 50% by mass or lower, the viscosity of the composition for forming a liquid crystal cured layer is decreased. Therefore, since the thickness of the liquid crystal cured layer becomes approximately uniform, unevenness in the liquid crystal cured layer tends not to arise. The solid content can be determined in consideration of the thickness of liquid crystal cured layer to be produced.

<Sensitizer>

The sensitizer is preferably a photosensitizer. Examples of the sensitizer include xanthone compounds such as xanthone and thioxanthone (for example, 2,4-diethylthioxanthone and 2-isopropylthioxanthone); anthracene compounds such as anthracene and an alkoxy group-containing anthracenes (for example, dibutoxyanthracene); phenothiazine and rubrene.

The content of the sensitizer in the composition for forming a liquid crystal cured layer is usually from 0.1 to 30 parts by mass, preferably from 0.5 to 10 parts by mass, and more preferably from 0.5 to 8 parts by mass, relative to 100 parts by mass of the content of the polymerizable liquid crystal compound.

<Polymerization Inhibitor>

Examples of the polymerization inhibitor include a radical scavenger such as hydroquinone, an alkoxy group-containing hydroquinone and an alkoxy group-containing catechol (for example, butylcatechol), phyrogallol, 2,2,6,6-tetramethyl-1-piperidinyloxyradical; thiophenols; β-naphthylamines and β-naphthols.

The content of the polymerization inhibitor in the composition for forming a liquid crystal cured layer is usually from 0.1 to 30 parts by mass, preferably from 0.5 to 10 parts by mass, and more preferably from 0.5 to 8 parts by mass, relative to 100 parts by mass of the content of the polymerizable liquid crystal compound.

<Leveling Agent>

The leveling agent has a function to adjust a flowability of the composition for forming a liquid crystal cured layer and to form a coating layer of the composition for forming a liquid crystal cured layer smoother, and examples thereof include a surfactant. Preferable examples of the leveling agent include a leveling agent consisting mainly of a polyacrylate compound and a leveling agent consisting mainly of a fluorine atom-containing compound.

Examples of the leveling agent consisting mainly of a polyacrylate compound include BYK-350, BYK-352, BYK-353, BYK-354, BYK-355, BYK-358N, BYK-361N, BYK-380, BYK-381 and BYK-392 (BYK Chemie).

Examples of the leveling agent consisting mainly of a fluorine atom-containing compound include Megafac® R-08, R-30, R-90, F-410, F-411, F-443, F-445, F-470, F-471, F-477, F-479, F-482 and F-483 (DIC Corporation); Surflon® S-381, S-382, 5-383, S-393, SC-101, SC-105, KH-40 and SA-100 (AGC SEIMI CHEMICAL CO., LTD); E1830 and E5844 (Daikin Fine Chemical Laboratory, Co., Ltd.); and F Top EF301, EF303, EF351 and EF352 (Mitsubishi Materials Electronic Chemicals Co., Ltd.).

The content of the leveling agent in the composition for forming a liquid crystal cured layer is usually 0.3 parts by mass or more and 5 parts by mass or less, and preferably 0.5 parts by mass or more and 3 parts by mass or less, relative to 100 parts by mass of the content of the polymerizable liquid crystal compound.

It is preferable that the content of the leveling agent is within the above-mentioned range, since it is easy to horizontally orientate the polymerizable liquid crystal compound and the obtained liquid crystal cured layer tends to be smoother. It is not preferable that the content of the leveling agent relative to the polymerizable liquid crystal compound exceeds the above-mentioned range, since unevenness in the liquid crystal cured layer tends to easily arise in this case. The composition for forming a liquid crystal cured layer may also comprise two or more of the leveling agents.

<Polymerizable Non-Liquid Crystal Compound>

The composition for forming a liquid crystal cured layer may also comprise a polymerizable non-liquid crystal compound. When the composition comprises the polymerizable non-liquid crystal compound, a crosslinking density at a polymerization-reactive part can be increased and strength of the liquid crystal cured layer can be improved.

The polymerizable non-liquid crystal compound preferably has at least one polymerizable group selected from the group consisting of acryloyl group, methacryloyl group and isocyanate group. The polymerizable non-liquid crystal compound more preferably has 2 to 10 polymerizable groups, and further preferably has 3 to 8 polymerizable groups.

The content of the polymerizable non-liquid crystal compound in the composition for forming a liquid crystal cured layer is usually from 0.1 to 30 parts by mass and preferably from 0.5 to 10 parts by mass, relative to 100 parts by mass of the solid content of the composition for forming a liquid crystal cured layer.

The liquid crystal cured layer can be obtained by polymerizing a polymerizable liquid crystal compound. The liquid crystal cured layer comprising the polymerizable liquid crystal compound which has polymerized while maintaining a liquid crystal phase of a smectic phase is high in polarizing performance such as a degree of polarization, compared with a conventional host-guest-type polarizing layer, that is, a polarizing layer obtained by polymerizing a polymerizable liquid crystal compound or the like while maintaining a liquid crystal phase of a nematic phase, and is superior in polarizing performance such as a degree of polarization and strength, compared with a layer obtained by only applying a dichroic dye or a lyotropic liquid crystal.

<Process for Producing Patterned Polarizing Film>

The patterned polarizing film of present invention is usually produced by a production process comprising the following steps of (1) to (4):

(1) a step of applying a composition comprising a polymerizable liquid crystal compound and a dichroic dye to a surface of a substrate or a substrate on which an orientation layer has been formed,
(2) a step of orientating the applied polymerizable liquid crystal compound and the applied dichroic dye,
(3) a step of applying an active energy ray to the orientated polymerizable liquid crystal compound through a photomask, thereby obtaining a liquid crystal cured layer comprising a polymer of the polymerizable liquid crystal compound and a unpolymerized polymerizable liquid crystal compound, and
(4) a step of washing the liquid crystal cured layer with a solvent in which the dichroic dye has a saturated solubility at 23° C. of 1% by mass or lower, and thereby removing the unpolymerized polymerizable liquid crystal compound, thereby obtaining a patterned liquid crystal cured layer.

<Step of (1)>

Examples of a method of applying the composition comprising a polymerizable liquid crystal compound and a dichroic dye (composition for forming a liquid crystal cured layer) include the same method as the methods of applying the anisotropic polymer composition on a substrate. In this step, the term "a surface of a substrate or a substrate on which an orientation layer has been formed" means a surface of the orientation layer which has been formed on the substrate.

<Step of (2)>

When the composition for forming a liquid crystal cured layer comprises a solvent, the solvent is usually removed from the applied composition for forming a liquid crystal cured layer. Examples of a method for removing the solvent include air drying, draught drying, heat drying and vacuum drying.

The applied polymerizable liquid crystal compound is usually orientated by cooling to a temperature at which liquid crystal orientation is achieved after heating more than to a temperature at which the compound changes into a molten state, so that a liquid crystal phase is formed.

The dichroic dye is usually orientated together with the polymerizable liquid crystal compound.

The temperature at which the applied polymerizable liquid crystal compound is orientated may be preliminarily determined by texture observation with a composition comprising the polymerizable liquid crystal compound. In addition, removal of the solvent and liquid crystal orientation may be also simultaneously carried out. The temperature at that time is, depending on the types of the solvent to be removed and the polymerizable liquid crystal compound, preferably in a range of 50 to 200° C., and when the substrate is a resin substrate, the temperature is more preferably in a range of 80 to 130° C.

When a patterned polarizing film having a function as a circular polarizing plate is obtained by using a quarter wavelength plate as a substrate, as to the orientation direction of the polymerizable liquid crystal compound, a transmission axis of the obtained liquid crystal cured layer and a slow axis (optical axis) of the substrate preferably make substantially 45 degrees. "Substantially 45 degrees" usually refers to a range of 45±5 degrees. When the liquid crystal cured layer and the optical axis of the substrate are identical or perpendicular to each other, a patterned polarizing film serving as an optical compensation film can be also obtained.

<Step of (3)>

The polymerizable liquid crystal compound is polymerized by applying an active energy ray to the orientated polymerizable liquid crystal compound through a photomask. In this case, the polymerizable liquid crystal compound in a region masked with the photomask does not polymerize.

The active energy ray is preferably applied while the photomask is appressed to the orientated polymerizable liquid crystal compound. When the active energy ray is applied while the photomask is appressed to the orientated polymerizable liquid crystal compound, a patterned liquid crystal cured layer having a clear edge can be obtained.

The polymerized polymerizable liquid crystal compound is a liquid crystal cured layer. The liquid crystal cured layer which comprises the polymerizable liquid crystal compound and the dichroic dye, which has been polymerized while maintaining a liquid crystal phase of a smectic phase is high in polarizing performance such as a degree of polarization, compared with a conventional host-guest-type polarizing layer which is obtained by polymerization of a polymerizable liquid crystal compound or the like while maintaining a liquid crystal phase of a nematic phase. The liquid crystal cured layer is also is superior in polarizing performance such as a degree of polarization and strength, compared with a layer obtained by only applying a dichroic dye or a lyotropic liquid crystal.

The shape of a region which is not masked with the photomask may be a desired shape, and various designs are possible by making the shape of the photomask into a linear shape, a zonation shape, a circular shape, a character-shape or a figure. The shape of a region masked with the photomask may be also a desired shape.

It is preferable to use a parallel light as a source of the active energy ray so that a configured pattern shape of the photomask is achieved. The source of the active energy ray may be a source which generates ultraviolet ray, electron ray, X-ray or the like. Preferable is a source having light emission distribution of 400 nm or lower, such as a low-pressure mercury lamp, a medium-pressure mercury lamp, a high-pressure mercury lamp, an extra high-pressure mercury lamp, a chemical lamp, a black light lamp, a microwave-excitation mercury lamp, or a metal halide lamp. The active energy ray is more preferably ultraviolet ray parallel to a normal direction of the substrate.

The irradiation energy of the active energy ray is set so that the exposure amount of the irradiation in a wavelength range effective to activation of a polymerization initiator is preferably from 10 to 5000 mJ/cm$^2$ and more preferably from 100 to 2000 mJ/cm$^2$. If the exposure amount of the irradiation is too lower than 10 mJ/cm$^2$, curing of the polymerizable liquid crystal compound is insufficient, and the liquid crystal cured layer tends to dissolve in a washing step.

<Step of (4)>

The liquid crystal cured layer comprising a polymer of the polymerizable liquid crystal compound and the unpolymerized polymerizable liquid crystal compound is washed with a solvent to remove the unpolymerized polymerizable liquid crystal compound in a region which is not masked with the photomask. The saturated solubility at 23° C. of the dichroic dye in this solvent is 1% by mass or lower. The saturated solubility is preferably 0.4% by mass or lower and more preferably 0.1% by mass or lower.

The patterned liquid crystal cured layer is obtained by washing with the solvent. The patterned liquid crystal cured layer refers to the same layer as the above-mentioned patterned liquid crystal cured layer.

Since the unpolymerized polymerizable liquid crystal compound can be removed while maintaining the dichroic dye contained in the patterned liquid crystal cured layer by washing with the solvent, a region having a high degree of polarization can be obtained. In addition, since the dichroic dye contained in the region can be sufficiently removed together with the unpolymerized polymerizable liquid crystal compound, a region having a high single transmittance can be obtained. The solvent is preferably a solvent which does not dissolve the substrate, and when such a solvent is used, the solvent does not damage the substrate, and thus, a region having a higher single transmittance can be obtained.

Examples of a method for washing with a solvent include a method in which a substrate on which a liquid crystal cured layer comprising a polymer of the polymerizable liquid crystal compound and the unpolymerized polymerizable liquid crystal compound is formed is dipped in a solvent to dissolve the unpolymerized polymerizable liquid crystal compound in the solvent; and a method in which a solvent is sprayed to a substrate on which the liquid crystal cured layer is formed to dissolve the unpolymerized polymerizable liquid crystal compound in the solvent.

The solvent for use in washing is preferably a solvent which dissolves the polymerizable liquid crystal compound and does not dissolve the liquid crystal cured layer. The solvent is arbitrarily selected depending on the dichroic dye contained in the composition for forming a liquid crystal cured layer.

Examples of the solvent include water; alcohol solvents such as methanol, ethanol, 1-propanol, isopropyl alcohol, butanol, pentanol, hexanol, heptanal, octanol, nonanol, decanol, undecanol, ethylene glycol, propylene glycol, methyl cellosolve, butyl cellosolve and propylene glycol monomethyl ether; ether solvents such as diethy ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, 2-heptanone and methyl isobutyl ketone; aliphatic hydrocarbon solvents such as pentane, hexane and heptane; aromatic hydrocarbon solvents such as toluene and xylene; and nitrile solvents such as acetonitrile. Preferable is a solvent comprising an alcohol solvent, and more preferable is at least one solvent selected from the group consisting of methanol, ethanol and isopropyl alcohol. A combined solvent of water and an alcohol solvent is preferable in view that dissolution of the polymerizable liquid crystal compound can be easily adjusted.

The content ratio of the alcohol solvent in the solvent comprising an alcohol solvent is usually from 10 to 100%, preferably from 30 to 100%, more preferably from 50 to 100%, and further preferably from 80 to 100%.

When washing is carried out with a solvent, drying may be carried out.

Thus, a patterned polarizing film comprising a patterned liquid crystal cured layer can be obtained. In the patterned polarizing film, the region in which the unpolymerized polymerizable liquid crystal compound and the dichroic dye contained therein are removed in the above-mentioned step (4) corresponds to the region (A), and the region comprising the patterned liquid crystal cured layer corresponds to the region (B).

Since the patterned polarizing film obtained by the production process of the present invention comprises a region having a high degree of polarization and a region having a high single transmittance, it is possible to provide a high polarizing property in only a necessary region in a display device or the like. The degree of polarization of this patterned polarizing film is within the above-mentioned range.

According to the patterned polarizing film obtained by this production process, it is possible to provide a high polarizing property in only a necessary region in a display device or the like by printing.

Figure 2:
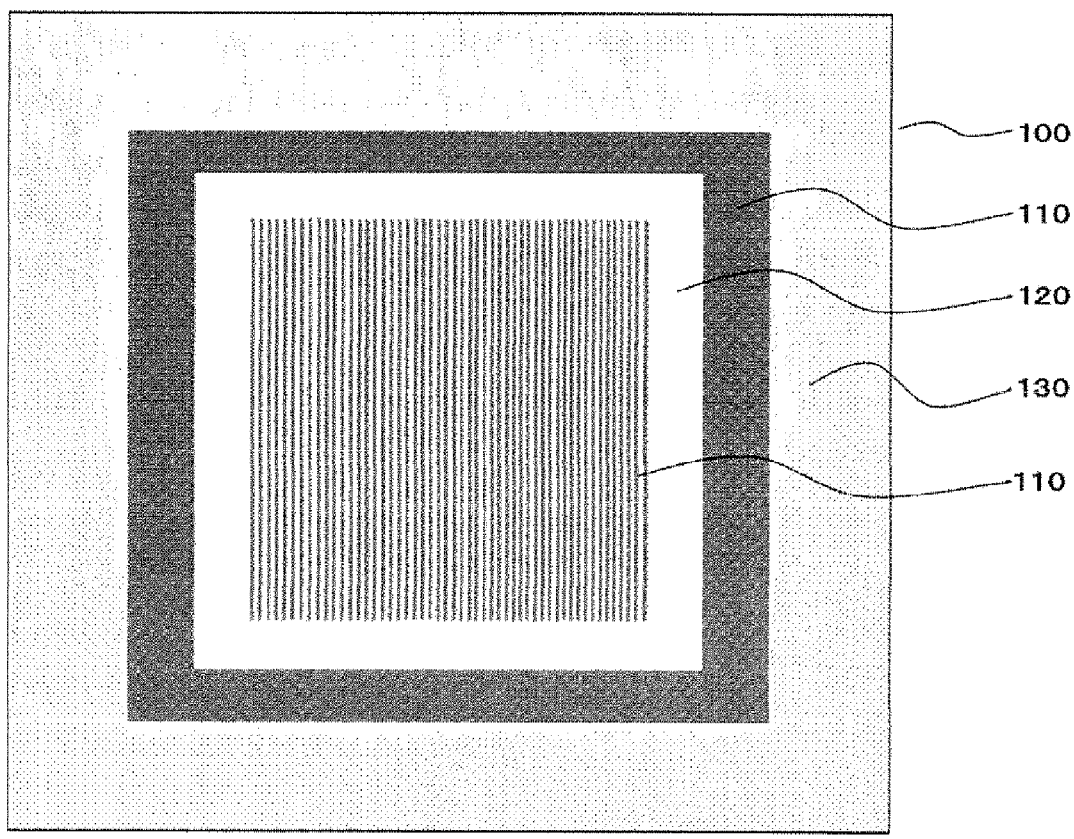
FIG. 2 is a diagram of the patterned circular polarizing plate comprising a patterned region in a striped shape.

FIG. 2 is a diagram of the patterned polarizing film 100 of the present invention comprising a stripe-shaped patterned region.

Part 110 represented by gray filling represents a region in which the liquid crystal cured layer has been formed, part 120 represented by white blank represents a region obtained by masking with the photomask, and part 130 represented by dots represents a region (mere edge part) in which the composition for forming a liquid crystal cured layer is not applied.

Figure 3:
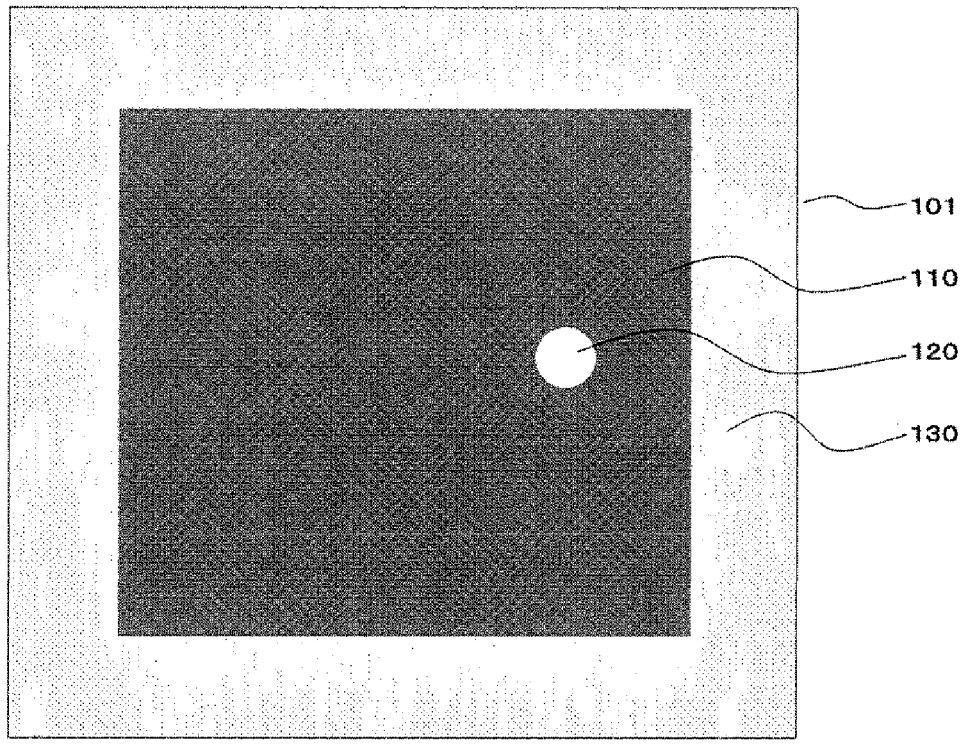
FIG. 3 is a diagram of the patterned circular polarizing plate comprising a patterned region in a circular shape.

FIG. 3 is a diagram of the patterned polarizing film 101 of the present invention comprising a circle-shaped patterned region. Parts 110, 120 and 130 in the figure are defined as in FIG. 2.

<Continuous Production Process of Patterned Polarizing Film>

Preferably, the patterned polarizing film is continuously produced in a Roll-to-Roll type. In reference to FIG. 5, an example of main parts of a Roll-to-Roll type continuous production process will be described.

A first roll 210, in which a substrate is wound up on a first winding core 210A, is easily available in the market, for example. Examples of the substrate in a roll-shape, which is available in the market, include a film made of a cellulosic ester, a cycloolefin-based resin, a polycarbonate, polyethylene terephthalate or a polymethacrylic acid ester, among the above-mentioned substrates.

Subsequently, the substrate is wound off from the first roll 210. The substrate is wound off by arranging a suitable rotary means at the winding core 210A of the first roll 210 and rotating the first roll 210 by the rotary means. Alternatively, a suitable auxiliary roll 300 may be arranged in a conveyance direction of the substrate from the first roll 210 in order to wind off the substrate by a rotary means of an auxiliary roll 300. Furthermore, by arranging a rotary means together with the first winding core 210A and the auxiliary roll 300, the substrate may be wound off while providing the substrate with a suitable tension.

On a surface of the substrate wound off from the first roll 210, a composition for forming a photo-orientation layer is applied by means of an application device 211A, when the substrate passes through the application device 211A. As the application device 211A for continuously applying the composition for forming a photo-orientation layer, preferable is gravure coating method, die coating method or flexo method.

The substrate which has passed through the application device 211A is conveyed to a drying furnace 212A, and dried in the drying furnace 212A to continuously form a first coating layer on the surface of the substrate. For example, hot air type drying furnace, in which draught drying method and heat drying method are combined, is used as the drying furnace 212A. The preset temperature of the drying furnace 212A is determined depending on the type of a solvent contained in the composition for forming a photo-orientation layer. The drying furnace 212A may comprise multiple zones having different preset temperatures, or may comprise multiple drying furnaces having different preset temperatures and arranged in series.

A photo-orientation layer is obtained by applying a polarization light to the obtained first coating layer by means of a polarization UV irradiation device 213A.

Subsequently, the substrate, on which the photo-orientation layer has been formed, passes through an application device 211B. A composition comprising a polymerizable liquid crystal compound, a dichroic dye and a solvent is applied on the photo-orientation layer by means of the application device 211B. Then, a second coating layer, in which the polymerizable liquid crystal compound and the dichroic dye have been orientated, is obtained by passing through a drying furnace 212B. The drying furnace 212B serves to remove the solvent from the composition comprising the polymerizable liquid crystal compound, the dichroic dye and the solvent, which is applied on the photo-orientation layer, and simultaneously serves to provide thermal energy in order to orientate the polymerizable liquid crystal compound contained in the composition. As is the case in the drying furnace 212A, the drying furnace 212B may comprise multiple zones having different preset temperatures, or comprise multiple drying furnaces having different preset temperatures and arranged in series.

The substrate is conveyed to an active energy ray irradiation device 213B in such a state that the polymerizable liquid crystal compound contained in the second coating layer has been orientated. In the active energy ray irradiation device 213B, a photomask (which is not described in the figure) is applied to the second coating layer, and an active energy ray is radiated. By the active energy ray radiation by means of the active energy ray irradiation device 213B, the polymerizable liquid crystal compound in the non-masked region polymerizes in the orientated state, and the liquid crystal cured layer comprising a polymer of the polymerizable liquid crystal compound and the unpolymerized polymerizable liquid crystal compound is obtained.

The substrate, in which the liquid crystal cured layer comprising a polymer of the polymerizable liquid crystal compound and the unpolymerized polymerizable liquid crystal compound has been formed, passes through a solvent tank 214 filled with a solvent in which the dichroic dye has a saturated solubility at 23° C. of 1% by mass or lower. By washing and removing the unpolymerized polymerizable liquid crystal compound in the region which is masked when the active energy ray radiation is carried out, the region (A) is formed.

Furthermore, by passing through a drying furnace 212C, a solvent attaching to the surface is removed.

The continuously produced patterned polarizing film is wound up on a second winding core 220A to obtain a second roll 220. In winding it up, it may be also wound up together with a suitable spacer.

Thus, the substrate passes from the first roll 210 through the application device 211A, the drying furnace 212A, the polarization UV irradiation device 213A, the application device 211B, the drying furnace 212B, the active energy ray irradiation device 213B, the solvent tank 214 and the drying furnace 212C in order, and as a result, the patterned polarizing film can be continuously produced in a Roll-to-Roll type.

Figure 5:
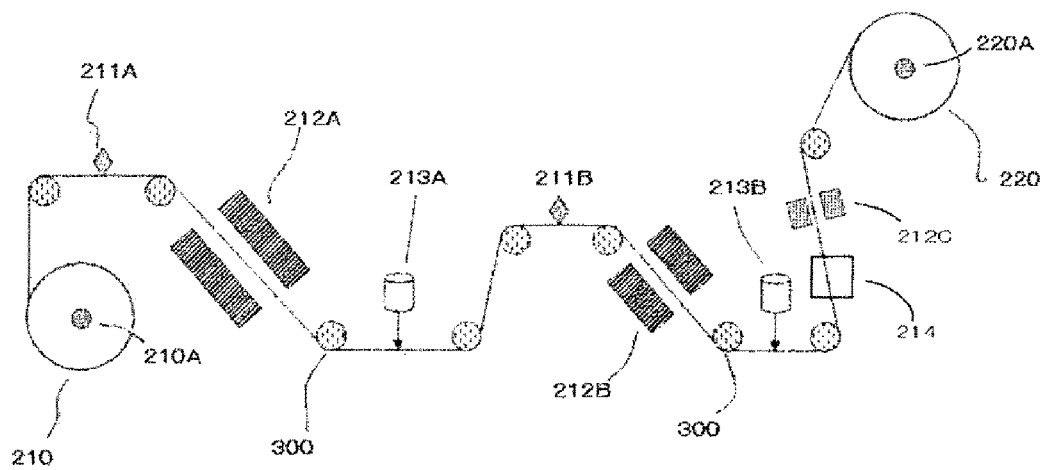
FIG. 5 is a diagram showing main parts of a (Roll-to-Roll type) continuous production process of a patterned polarizing film of the present invention.

The production process shown in FIG. 5 represents a process for continuously producing the patterned polarizing film from a substrate. For example, a substrate passes from a first roll through the application device 211A, the drying furnace 212A and the polarization UV irradiation device 213A in order, and is wound up on a winding core to produce a roll-shaped laminated product of the substrate and a photo-orientation layer. Furthermore, the roll-shaped laminated product is wound off, and passed through the application device 211B, the drying furnace 212B, the active energy ray irradiation device 213B, the solvent tank 214 and the drying furnace 212C in order, and as a result, a patterned polarizing layer can be also continuously produced.

When the patterned polarizing film has been produced in a shape of the second roll 220, a patterned circular polarizing plate may be also produced by winding off a rolled patterned polarizing film from the second roll 220, cutting it into a prescribed dimension and then sticking a quarter wavelength plate to the cut patterned polarizing film, and additionally the rolled patterned circular polarizing plate may be also continuously produced by setting a third roll in which a rolled quarter wavelength plate is wound up on a winding core.

Figure 6:
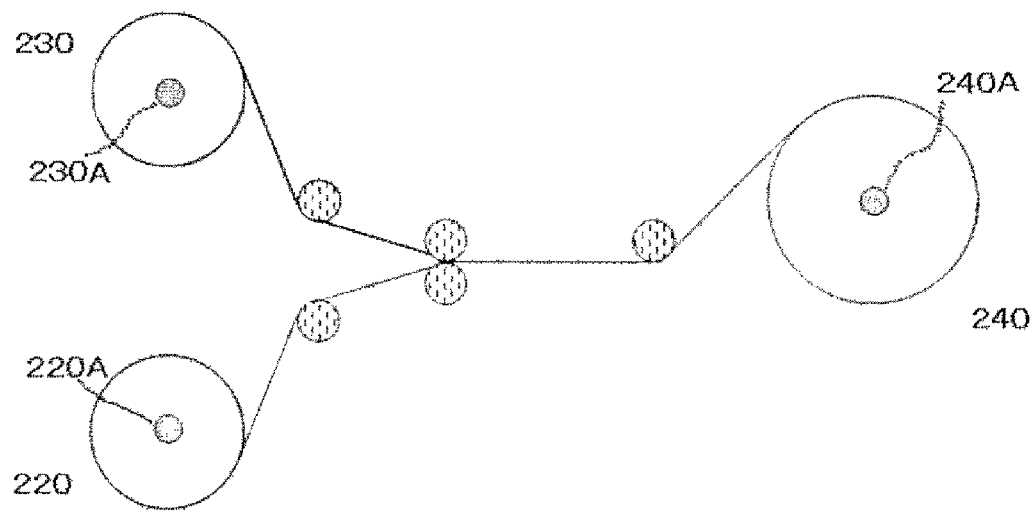
FIG. 6 is a diagram showing main parts of a continuous production process of a patterned circular polarizing plate.

A process for producing the rolled patterned circular polarizing plate will be described in reference to FIG. 6. The process comprises:

a step of continuously winding off a patterned polarizing film from the second roll 220 while continuously winding off a rolled quarter wavelength plate from a third roll 230 in which the rolled quarter wavelength plate is wound up, a step of continuously sticking the patterned polarizing film to the rolled quarter wavelength plate to obtain a rolled patterned circular polarizing plate, and a step of winding up the obtained rolled patterned circular polarizing plate on a fourth winding core 240A to obtain a fourth roll 240.

This process is so-called Roll-to-Roll sticking. An adhesive agent may be used in sticking.

EXAMPLES

Hereinafter, the present invention will be described in more detail by examples. "%" and "part(s)" in the examples refer to % by mass and part(s) by mass, unless otherwise described.

[Measurement Method of Saturated Solubility]

A saturated solubility at 23° C. of each dichroic dye in certain solvents was measured in the following method. In a sample tube, 5 g of each solvent and 0.2 g of a dichroic dye were weighed, and agitation was carried out in a water bath set at 23° C. for 24 hours to prepare a saturated solubility solution. This solution was sampled, and was dissolved together with 5 ml of a standard liquid in tetrahydrofuran to prepare a measurement solution. This measurement solution was injected into a liquid chromatograph (manufactured by SHIMADZU Corporation; LC-10AT), and a saturated solubility at 23° C. of each dichroic dye in certain solvents was calculated from a ratio of each peak area value and a separately prepared calibration curve. The standard liquid was prepared from 10 ml of hexylbenzene and 1000 ml of acetonitrile.

The liquid chromatograph (LC) measurement was carried out in the following condition.

Used column: KinetexC18, 2.6 μm, 100 mm×4.6 mm diameter
Column temperature: 40° C.
Mobile Phase:
   (A liquid) 0.1%(v/v)—TFA/water
   (B liquid) 0.1%(v/v)—TFA/acetonitrile 500/THF 50%
   Gradient condition 0 min A liquid 60%, B liquid 40%
     30 min A liquid 0%, B liquid 100%
     35 min A liquid 0%, B liquid 100%
     35.1 min A liquid 60%, B liquid 40%
     45 min STOP TOTAL 45 min
Flow volume: 1.0 mL/min
Injection amount: 5 μL
Detection method: UV (254 nm)

Example 1

[Production of Composition for Forming a Photo-Orientation Layer]

The following components were mixed, and the obtained mixture was stirred at 80° C. for one hour to obtain a composition for forming a photo-orientation layer. The following polymer having a photo-reactive group was synthesized in the method described in JP 2013-33248 A.
Polymer having photo-reactive group:

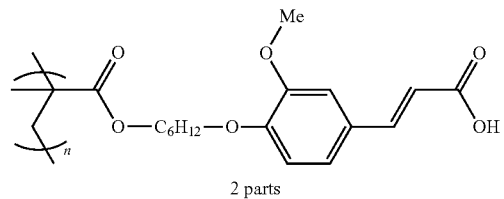

2 parts

Solvent: O-xylene 98 Parts (Production of Composition for Forming a Liquid Crystal Cured Layer 1)

The following components were mixed, and the obtained mixture was stirred at 80° C. for one hour to obtain a composition for forming a photo-orientation layer. As a dichroic dye, the azo-based dye described in the Examples of JP 2013-101328 A was used. The polymerizable liquid crystal compounds represented by formulae (1-6) and (1-7) were synthesized according to the method described in JP 4719156 B.

Polymerizable Liquid Crystal Compound:

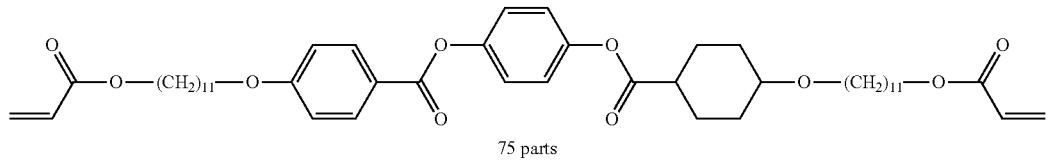

(1-6)

75 parts

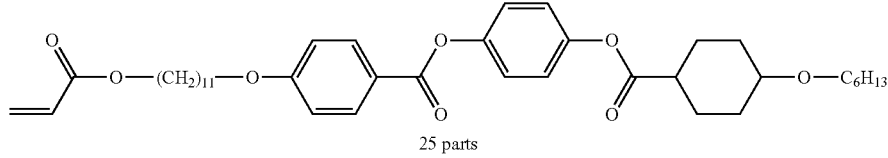

(1-7)

25 parts

Dichroic dye 1:

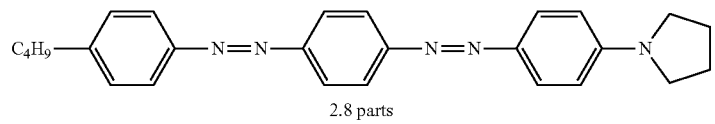

2.8 parts

Polymerization Initiator;

| | |
|---|---|
| 2-dimethylamino-2-benzyl-1-(4-morpholinophenyl)butan-1-one (Irgacure ® 369; manufactured by Ciba Speciality Chemicals) | 6 parts |
| Leveling agent; Polyacrylate compound (BYK-361N; manufactured by BYK-Chemie) | 1.2 parts |
| Solvent; o-xylene | 250 parts |

[Production of Patterned Polarizing Film (1)]

A triacetyl cellulose film (manufactured by Konica Minolta, Inc., KC4UY-TAC, thickness 40 μm) was cut into 80 mm×80 mm, and corona treatment (AGF-B10, manufactured by KASUGA Electric Works LTD.) was carried out on its surface. A composition for forming a photo-orientation layer was applied to the corona-treated film surface by means of a bar coater, and then dried in a drying oven set at 120° C. for one minute to form a first coating layer. Polarization UV in a direction of 0 degree relative to longitudinal direction of the film was applied to the first coating layer at 50 mJ/cm² (313 nm basis) of an integrated light amount by means of a polarization UV irradiation device (SPOT CURE SP-7; manufactured by USHIO Inc.) to prepare a photo-orientation layer. A composition for forming a liquid crystal cured layer was applied on a 70 mm×80 mm region in the obtained photo-orientation layer by means of a bar coater, and then dried in a drying oven set at 110° C. for one minute to obtain a second coating layer in which the polymerizable liquid crystal compounds and the dichroic dye were orientated. Ultraviolet ray (under nitrogen atmosphere, wavelength: 365 nm, integrated light amount at 365 nm of wavelength: 1000 mJ/cm²) was applied to a central part of the second coating layer through a 40 mm×40 mm photomask (line width 275 μm) by means of a high-pressure mercury lamp (UNICURE VB-15201BY-A, manufactured by USHIO INC.) to obtain a liquid crystal cured layer comprising a polymer of the polymerizable liquid crystal compound and a unpolymerized polymerizable liquid crystal compound. The obtained film comprising the liquid crystal cured layer was dipped in ethanol for three minutes to wash and remove the unpolymerized polymerizable liquid crystal compound to obtain patterned polarizing film (1) having a striped pattern. The obtained patterned polarizing film (1) had the same shape as shown in the diagram of the patterned polarizing film of the present invention represented in FIG. 2.

The saturated solubility of dichroic dye 1 in ethanol was 0.003% by mass.

[Evaluation of Patterned Polarizing Film (1)]

(Measurement of Degree of Polarization and Single Transmittance)

As to a region in which the patterned liquid crystal cured layer was formed and a region obtained by masking with the photomask in patterned polarizing film (1), a degree of polarization and single transmittance were measured as follows. A transmittance in a transmission axis direction ($T^1$) and a transmittance in an absorption axis direction ($T^2$) were measured at 2 nm step in wavelength of 380 to 680 nm in a double-beam method by means of a device in which a folder equipped with a polarizer was set to a spectrophotometer. A degree of polarization and a single transmittance were calculated with the following formula (10) and formula (11) from the transmittance in a transmission axis direction ($T^1$) and the transmittance in an absorption axis direction ($T^2$) at wavelength when absorbance in an absorption direction was maximum (λMAX). As a result, in the region in which the patterned liquid crystal cured layer was formed, λMAX was 520 nm, a degree of polarization was 92.8%, and a single transmittance was 44.0%. On the other hand, in the region obtained by masking with the photomask, light absorption was not measured, and a degree of polarization was 0% and a single transmittance was 92%.

$$\text{Single Transmittance (\%)} = (T^1 + T^2)/2 \quad (10)$$

$$\text{Degree of polarization (\%)} = [(T^1 - T^2)/(T^1 + T^2)] \times 100 \quad (11)$$

(Measurement of Thickness)

The thicknesses of the patterned liquid crystal cured layer in patterned polarizing film (1), which was measured by means of a laser microscope (LEXT, manufactured by Olympus Corporation), was 2.0 μm. The thickness of patterned polarizing film (1) was 42 μm.

(Measurement of Line Width)

In patterned polarizing film (1), the width of the liquid crystal cured layer formed in a striped shape was measured by means of a polarization microscope. When 5 different points of the width in the liquid crystal cured layer were measured, each of the width values was 271 μm, 275 μm, 275 μm, 274 μm and 278 μm. These nearly corresponded to the line width of the photomask (275 μm), and it was confirmed that pattering at the width of the photomask could be carried out. Each of the areas of the liquid crystal cured layer formed in a striped shape was 8.3 mm².

(Measurement of Ellipticity)

A quarter wavelength plate which was a uniaxially-stretched film of a cycloolefin-based resin (ZEONOR film, ZEON Corporation, in-plane retardation value Ro: 138 nm) was stuck to patterned polarizing film (1) via a pressure-sensitive adhesive agent to obtain patterned circular polarizing plate (1). As to the region in which the patterned liquid crystal cured layer was laminated and the region obtained by masking with the photomask in patterned circular polarizing plate (1), the ellipticities for a light having wavelength of 550 nm were measured by means of an automatic birefringence measuring apparatus "KOBRA® " manufactured by Oji Scientific Instruments. As a result, the ellipticity at 550 nm of wavelength in the region, in which the patterned liquid crystal cured layer was laminated, was 92%. The ellipticity at 550 nm of wavelength in the region obtained by masking with the photomask was 0%. That is to say, a patterned circular polarizing plate having a superior anti-reflection property for a light having certain wavelength could be obtained from patterned polarizing film (1).

Example 2

(Production of Composition for Forming a Liquid Crystal Cured Layer 2)

Patterned polarizing film (2) was produced in the same condition as in Example 1 except in that the following dichroic dyes were further added to composition for forming a liquid crystal cured layer 1 of Example 1 to produce composition for forming a liquid crystal cured layer 2, and that composition for forming a liquid crystal cured layer 2 was used as an application liquid.

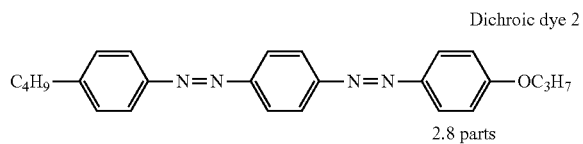

Dichroic dye 2

2.8 parts

-continued

Dichroic dye 3

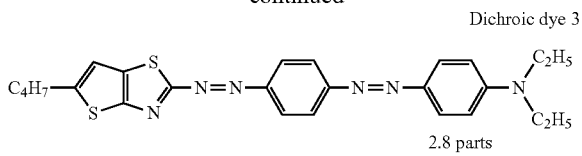

2.8 parts

The saturated solubility of dichroic dye 2 in ethanol was 0.001% by mass.

The saturated solubility of dichroic dye 3 in ethanol was 0.061% by mass.

[Evaluation of Patterned Polarizing Film]

(Measurement of Degree of Polarization and Single Transmittance)

As is the case in Example 1, a degree of polarization and a single transmittance were measured. A luminous degree of polarization (Py) and a luminous transmittance (Ty) were calculated by carrying out visibility correction with two-degree visibility of JIS Z 8701 (C light source). As a result, in the region in which the patterned liquid crystal cured layer was formed, Py=92.3%, and Ty=43.7%. In the region obtained by masking with the photomask, Py=0%, and Ty=92.0%.

(Measurement of Thickness)

The thicknesses of the patterned liquid crystal cured layer in patterned polarizing film (2), which was measured by means of a laser microscope (LEXT, manufactured by Olympus Corporation), was 2.0 μm. A reduction layer ratio before and after washing of the liquid crystal cured layer comprising the polymer of the polymerizable liquid crystal compound was 0%. The thickness of patterned polarizing film (2) was 42 μm.

(Measurement of Line Width)

In patterned polarizing film (2), the width of the liquid crystal cured layer formed in a striped shape was measured by means of a polarization microscope. When 5 different points of the width in the liquid crystal cured layer were measured, each of the width values was 275 μm, 272 μm, 275 μm, 274 μm and 274 μm. These nearly corresponded to the line width of the photomask (275 μm), and it was confirmed that patterning at the width of the photomask could be carried out. Each of the areas of the liquid crystal cured layer formed in a striped shape was 8.3 mm$^2$.

(Measurement of Ellipticity)

A quarter wavelength plate which was a uniaxially-stretched film (PURE-ACE WRF-S, TEIJIN LIMITED) was stuck to patterned polarizing film (2) via a pressure-sensitive adhesive agent to obtain patterned circular polarizing plate (2). When a retardation (Re($\lambda$)) of the quarter wavelength plate was measured by means of an automatic birefringence measuring apparatus "KOBRA®" manufactured by Oji Scientific Instruments, Re(450)=132 nm, Re(550)=145 nm, Re(590)=147 nm, Re(630)=148 nm, and Re(750)=151 nm, and a reverse wavelength dispersibility was shown. As to the region in which the patterned liquid crystal cured layer was laminated and the region obtained by masking with the photomask in patterned circular polarizing plate (2), the ellipticities for lights having wavelength of 450 nm, 550 nm, 590 nm, 630 nm and 750 nm were measured by means of an automatic birefringence measuring apparatus "KOBRA®" manufactured by Oji Scientific Instruments. As a result, in the region in which the patterned liquid crystal cured layer was laminated, the ellipticity at 450 nm of wavelength was 77%, the ellipticity at 550 nm of wavelength was 91%, the ellipticity at 590 nm of wavelength was 99%, and the ellipticity at 630 nm of wavelength was 92%. In the region obtained by masking with the photomask, the ellipticity at 450 nm of wavelength was 0%, the ellipticity at 550 nm of wavelength was 0%, the ellipticity at 590 nm of wavelength was 0%, and the ellipticity at 630 nm of wavelength was 0%. That is to say, a patterned circular polarizing plate having a superior anti-reflection property could be obtained from patterned polarizing film (2).

Example 3

Patterned polarizing film (3) was obtained in the same condition as in Example 2 except in that methanol was used instead of ethanol as the solvent for washing the liquid crystal cured layer in Example 2.

The saturated solubility of dichroic dye 1 in methanol was 0.001% by mass.

The saturated solubility of dichroic dye 2 in methanol was 0.001% by mass.

The saturated solubility of dichroic dye 3 in methanol was 0.015% by mass.

[Evaluation of Patterned Polarizing Film]

(Measurement of Degree of Polarization and Single Transmittance)

As is the case in Example 2, a luminous degree of polarization (Py) and a luminous transmittance (Ty) were calculated. As a result, in the region in which the patterned liquid crystal cured layer was formed, Py=92.7%, and Ty=43.9%. In the region obtained by masking with the photomask, Py=0%, and Ty=92.0%.

(Measurement of Thickness)

The thicknesses of the patterned liquid crystal cured layer in patterned polarizing film (3), which was measured by means of a laser microscope (LEXT, manufactured by Olympus Corporation), was 2.1 μm. A reduction layer ratio before and after washing of the liquid crystal cured layer comprising the polymer of the polymerizable liquid crystal compound was 0%. The thickness of patterned polarizing film (3) was 43 μm.

(Measurement of Line Width)

In patterned polarizing film (3), the width of the liquid crystal cured layer formed in a striped shape was measured by means of a polarization microscope. When 5 different points of the width in the liquid crystal cured layer were measured, each of the width values was 278 μm, 275 μm, 277 μm, 278 μm and 274 μm. These nearly corresponded to the line width of the photomask (275 μm), and it was confirmed that patterning at the width of the photomask could be carried out. The continuous area of the liquid crystal cured layer formed in a striped shape was 8.3 mm$^2$.

Example 4

Patterned polarizing film (4) was obtained in the same condition as in Example 2 except in that isopropyl alcohol was used instead of ethanol as the solvent for washing the liquid crystal cured layer in Example 2.

The saturated solubility of dichroic dye 1 in isopropyl alcohol was 0.002% by mass.

The saturated solubility of dichroic dye 2 in isopropyl alcohol was 0.043% by mass.

The saturated solubility of dichroic dye 3 in isopropyl alcohol was 0.001% by mass.

[Evaluation of Patterned Polarizing Film]

(Measurement of Degree of Polarization and Single Transmittance)

As is the case in Example 2, a luminous degree of polarization (Py) and a luminous transmittance (Ty) were calculated. As a result, in the region in which the patterned liquid crystal cured layer was formed, Py=93.8%, and Ty=43.6%. In the region obtained by masking with the photomask, Py=0%, and Ty=92.0%.
(Measurement of Thickness)

The thicknesses of the patterned liquid crystal cured layer in patterned polarizing film (4), which was measured by means of a laser microscope (LEXT, manufactured by Olympus Corporation), was 2.0 μm. A reduction layer ratio before and after washing of the liquid crystal cured layer comprising the polymer of the polymerizable liquid crystal compound was 0%. The thickness of patterned polarizing film (4) was 43 μm.
(Measurement of Line Width)

In patterned polarizing film (4), the width of the liquid crystal cured layer formed in a striped shape was measured by means of a polarization microscope. When 5 different points of the width in the liquid crystal cured layer were measured, each of the width values was 274 μm, 278 μm, 275 μm, 277 μm and 278 μm. These nearly corresponded to the line width of the photomask (275 μm), and it was confirmed that pattering at the width of the photomask could be carried out. The continuous area of the liquid crystal cured layer formed in a striped shape was 8.3 mm$^2$.

Example 5

Patterned polarizing film (5) was obtained in the same condition as in Example 2 except in that propylene glycol 1-monomethyl ether was used instead of ethanol as the solvent for washing the liquid crystal cured layer in Example 2, and that the time in washing and removing the polymerizable liquid crystal compound by dipping in the solvent was 20 seconds.

The saturated solubility of dichroic dye 1 in propylene glycol 1-monomethyl ether was 0.028% by mass.

The saturated solubility of dichroic dye 2 in propylene glycol 1-monomethyl ether was 0.336% by mass.

The saturated solubility of dichroic dye 3 in propylene glycol 1-monomethyl ether was 0.017% by mass.
[Evaluation of Patterned Polarizing Film]
(Measurement of Degree of Polarization and Single Transmittance)

As is the case in Example 2, a luminous degree of polarization (Py) and a luminous transmittance (Ty) were calculated. As a result, in the region in which the patterned liquid crystal cured layer was formed, Py=93.7%, and Ty=44.2%. In the region obtained by masking with the photomask, Py=0%, and Ty=92.0%.
(Measurement of Thickness)

The thicknesses of the patterned liquid crystal cured layer in patterned polarizing film (5), which was measured by means of a laser microscope (LEXT, manufactured by Olympus Corporation), was 2.0 μm. A reduction layer ratio before and after washing of the liquid crystal cured layer comprising the polymer of the polymerizable liquid crystal compound was 0%. The thickness of patterned polarizing film (5) was 42 μm.
(Measurement of Line Width)

In patterned polarizing film (5), the width of the liquid crystal cured layer formed in a striped shape was measured by means of a polarization microscope. When 5 different points of the width in the liquid crystal cured layer were measured, each of the width values was 272 μm, 278 μm, 277 μm, 274 μm and 275 μm. These nearly corresponded to the line width of the photomask (275 μm), and it was confirmed that pattering at the width of the photomask could be carried out. The continuous area of the liquid crystal cured layer formed in a striped shape was 8.3 mm$^2$.

Example 6

Patterned polarizing film (6) was produced in the same condition as in Example 1 except in that a uniaxially-stretched film used in Example 2 (PURE-ACE WRF-S, manufactured by TEIJIN LIMITED, thickness 50 μm) was instead of the triacetyl cellulose film, and that irradiation of polarization UV was carried out in such a way that a polarization oscillation direction of the polarization UV was at 45 degrees relative to a slow axis of the uniaxially-stretched film.
[Measurement of Patterned Polarizing Film (6)]
(Measurement of Degree of Polarization and Single Transmittance)

As is the case in Example 2, a luminous degree of polarization (Py) and a luminous transmittance (Ty) were measured. As a result, in the region in which the patterned liquid crystal cured layer was formed, Py=95.7%, and Ty=41.7%. In the region obtained by masking with the photomask, Py=0%, and Ty=89.0%.
(Measurement of Thickness)

The thicknesses of the patterned liquid crystal cured layer in patterned polarizing film (6), which was measured by means of a laser microscope (LEXT, manufactured by Olympus Corporation), was 2.5 μm. The thickness of patterned polarizing film (6) was 53 μm.
(Measurement of Line Width)

In patterned polarizing film (6), the width of the liquid crystal cured layer formed in a striped shape was measured by means of a polarization microscope. When 5 different points of the width in the liquid crystal cured layer were measured, each of the width values was 276 μm, 277 μm, 276 μm, 274 μm and 273 μm. These nearly corresponded to the line width of the photomask (275 μm), and it was confirmed that pattering at the width of the photomask could be carried out. The continuous area of the liquid crystal cured layer formed in a striped shape was 8.3 mm$^2$.
(Measurement of Ellipticity)

As to the region in which the patterned liquid crystal cured layer was formed and the region obtained by masking with the photomask in patterned polarizing film (6), the ellipticities for lights having wavelength of 450 nm, 550 nm, 590 nm, 630 nm and 750 nm were measured by means of an automatic birefringence measuring apparatus "KOBRA®" manufactured by Oji Scientific Instruments. As a result, in the region in which the patterned liquid crystal cured layer was formed, the ellipticity at 450 nm of wavelength was 78%, the ellipticity at 550 nm of wavelength was 92%, the ellipticity at 590 nm of wavelength was 96%, and the ellipticity at 630 nm of wavelength was 88%. In the region obtained by masking with the photomask, the ellipticity at 450 nm of wavelength was 0%, the ellipticity at 550 nm of wavelength was 0%, the ellipticity at 590 nm of wavelength was 0%, and the ellipticity at 630 nm of wavelength was 0%. That is to say, patterned polarizing film (6) is a patterned circular polarizing plate having a superior anti-reflection property.

Reference Example 1

Patterned polarizing film (7) was obtained in the same condition as in Example 2 except in that propylene glycol 1-monomethyl ether 2-acetate was used, instead of ethanol as the solvent for washing the liquid crystal cured layer in Example 2.

The saturated solubility of dichroic dye 1 in propylene glycol 1-monomethyl ether 2-acetate was 0.077% by mass.

The saturated solubility of dichroic dye 2 in propylene glycol 1-monomethyl ether 2-acetate was 0.89% by mass.

The saturated solubility of dichroic dye 3 in propylene glycol 1-monomethyl ether 2-acetate was 0.026% by mass.

[Evaluation of Patterned Polarizing Film]
(Measurement of Degree of Polarization and Single Transmittance)

As is the case in Example 2, a luminous degree of polarization (Py) and a luminous transmittance (Ty) were calculated. As a result, in the region in which the patterned liquid crystal cured layer was formed, Py=66.4%, and Ty=49.8%. In the region obtained by masking with the photomask, Py=0%, and Ty=92.0%.

(Measurement of Thickness)

The thicknesses of the patterned liquid crystal cured layer in patterned polarizing film (7), which was measured by means of a laser microscope (LEXT, manufactured by Olympus Corporation), was 1.85 µm. A reduction layer ratio before and after washing of the liquid crystal cured layer comprising the polymer of the polymerizable liquid crystal compound was 5%. The thickness of patterned polarizing film (7) was 42 µm.

(Measurement of Line Width)

In patterned polarizing film (7), the width of the liquid crystal cured layer formed in a striped shape was measured by means of a polarization microscope. When 5 different points of the width in the liquid crystal cured layer were measured, each of the width values was 282 µm, 270 µm, 272 µm, 279 µm and 277 µm. These nearly corresponded to the line width of the photomask (275 µm), and it was confirmed that pattering at the width of the photomask could be carried out. The continuous area of the liquid crystal cured layer formed in a striped shape was 8.3 mm².

Reference Example 2

When patterned polarizing film (8) was produced in the same condition as in Example 2 except in that ethyl acetate was used instead of ethanol as the solvent for washing the liquid crystal cured layer in Example 2, the triacetyl cellulose film as the substrate film dissolved, and a sample could not be obtained. Thus, on a 50 mm×50 mm glass substrate (thickness 1 mm) instead of the triacetyl cellulose film, a composition for forming a photo-orientation layer was applied by means of a spin coater, and then dried in a hot plate set at 120° C. for one minute to obtain a first coating layer. Polarization UV in a direction at 0 degree relative to longitudinal direction of the film was applied to the first coating layer at 50 mJ/cm² (313 nm basis) of an integrated light amount by means of a polarization UV irradiation device (SPOT CURE SP-7; manufactured by USHIO Inc.) to prepare a photo-orientation layer. A composition for forming a liquid crystal cured layer was applied on a 50 mm×50 mm region in the obtained photo-orientation layer by means of a spin coater, and then dried in a hot plate set at 110° C. for one minute to obtain a second coating layer in which the polymerizable liquid crystal compounds and the dichroic dye were orientated.

Ultraviolet ray (under nitrogen atmosphere, wavelength: 365 nm, integrated light amount at 365 nm of wavelength: 1000 mJ/cm²) was applied to a central part of the second coating layer through a 40 mm×40 mm photomask (line width 275 µm) by means of a high-pressure mercury lamp (UNICURE VB-15201BY-A, manufactured by USHIO INC.) to obtain a liquid crystal cured layer comprising the polymer of the polymerizable liquid crystal compound and a unpolymerized polymerizable liquid crystal compound.

The saturated solubility of dichroic dye 1 in ethyl acetate was 0.059% by mass.

The saturated solubility of dichroic dye 2 in ethyl acetate was 1.3% by mass.

The saturated solubility of dichroic dye 3 in ethyl acetate was 0.023% by mass.

[Evaluation of Patterned Polarizing Glass]
(Measurement of Degree of Polarization and Single Transmittance)

As is the case in Example 2, a luminous degree of polarization (Py) and a luminous transmittance (Ty) were calculated. As a result, in the region in which the patterned liquid crystal cured layer was formed, Py=33.1%, and Ty=58.7%. In the region obtained by masking with the photomask, Py=0%, and Ty=92.0%.

(Measurement of Thickness)

The thicknesses of the patterned liquid crystal cured layer in patterned polarizing film (8), which was measured by means of a laser microscope (LEXT, manufactured by Olympus Corporation), was 1.85 µm. A reduction layer ratio before and after washing of the liquid crystal cured layer comprising the polymer of the polymerizable liquid crystal compound was 8%. The thickness of patterned polarizing film (8) was 1002 µm.

(Measurement of Line Width)

In patterned polarizing film (8), the width of the liquid crystal cured layer formed in a striped shape was measured by means of a polarization microscope. When 5 different points of the width in the liquid crystal cured layer were measured, each of the width values was 277 µm, 274 µm, 278 µm, 274 µm and 273 µm. These nearly corresponded to the line width of the photomask (275 µm), and it was confirmed that pattering at the width of the photomask could be carried out. The continuous area of the liquid crystal cured layer formed in a striped shape was 8.3 mm².

Reference Example 3

When patterned polarizing film (9) was produced in the same condition as in Example 2 except in that tetrahydrofuran was used instead of ethanol as the solvent for washing the liquid crystal cured layer in Example 2, the triacetyl cellulose film as the substrate film dissolved, and a sample could not be obtained. Thus, as is the case in Reference Example 2, a patterned liquid crystal cured layer is formed on the glass substrate.

The saturated solubility of dichroic dye 1 in tetrahydrofuran was 0.33% by mass.

The saturated solubility of dichroic dye 2 in tetrahydrofuran was 4.5% by mass.

The saturated solubility of dichroic dye 3 in tetrahydrofuran was 0.33% by mass.

[Evaluation of Patterned Polarizing Glass]
(Measurement of Degree of Polarization and Single Transmittance)

As is the case in Example 2, a luminous degree of polarization (Py) and a luminous transmittance (Ty) were calculated. As a result, in the region in which the patterned liquid crystal cured layer was formed, Py=0.1%, and Ty=92.1%. In the region obtained by masking with the photomask, Py=0%, and Ty=92.0%. Even the polymer of polymerizable liquid crystal compound dissolved, and a very few patterned liquid crystal cured layer could be obtained.

The patterned polarizing film of the present invention is useful for obtaining a thin patterned circular polarizing plate having a superior anti-reflection property. In addition, according to the production process of a patterned polarizing film of the present invention, it is possible to produce a patterned polarizing film comprising a region having a high degree of polarization and a region having a high single transmittance.

DESCRIPTION OF SYMBOLS

1: Patterned liquid crystal cured layer
2: Substrate
3: Half wavelength plate
4: Positive C film
6: Quarter wavelength plate
10: Patterned circular polarizing plate
100: Patterned polarizing film comprising patterned region in striped shape
101: Patterned polarizing film comprising patterned region in circular shape
110: Region in which liquid crystal layer is formed
120: Region obtained by masking with photomask
130: Region in which composition for forming liquid crystal cured layer is not applied
210: First roll
210A: Winding core
220: Second roll
220A: Winding core
211A, 211B: Application device
212A, 212B, 212C: Drying furnace
213A: Polarization UV irradiation device
213B: Active energy ray irradiation device
214: Solvent tank
300: Auxiliary roll
230: Third roll
230A: Winding core
240: Fourth roll
240A: Winding core
300: Auxiliary roll
400: Cross-section of patterned polarizing film
410: Liquid crystal cured layer
420: Substrate
H: Thickness of region in which liquid crystal cured layer is laminated
h: Thickness of liquid crystal cured layer

The invention claimed is:

1. A patterned polarizing film comprising a laminate of a substrate and a patterned liquid crystal cured layer comprising a dichroic dye and a polymer of a polymerizable liquid crystal compound(s), the patterned polarizing film has one or more regions (A) and one or more regions (B),
wherein the patterned polarizing film has
a region (A) having a degree of polarization of 10% or lower and a single transmittance of 80% or higher, and
a region (B) having a degree of polarization of 90% or higher and a single transmittance of 40% or higher.

2. The patterned polarizing film according to claim 1, wherein the region (B) has the liquid crystal cured layer.

3. The patterned polarizing film according to claim 1, wherein the region (A) and the region (B) have a shape selected from a linear shape, a zonation shape, a circular shape, a character-shape and a figure-shape independently of each other.

4. The patterned polarizing film according to claim 3, wherein the region (A) has a linear shape and has a width of 1 μm to 10 mm.

5. The patterned polarizing film according to claim 3, wherein the region (B) has a linear shape and has a width of 1 μm to 10 mm.

6. The patterned polarizing film according to claim 3, wherein the region (A) has a zonation shape, a circular shape, a character-shape or a figure-shape, and
wherein each of the one or more regions (A) has an area of 500 $mm^2$ or less.

7. The patterned polarizing film according to claim 3, wherein the region (B) has a zonation shape, a circular shape, a character-shape or a figure-shape, and wherein each of the one or more regions (B) has an area of 500 $mm^2$ or less.

8. The patterned polarizing film according to claim 1, wherein the patterned polarizing film has the region (A) and the region (B) in stripes.

9. The patterned polarizing film according to claim 8, wherein the region (B) has a width of 1 μm to 10 mm.

10. The patterned polarizing film according to claim 8, wherein the region (B) has a width of 1 μm to 1 mm.

11. A patterned polarizing film according to claim 1, wherein the substrate is a retardation film having a quarter wavelength plate function.

12. A patterned polarizing film according to claim 1, wherein the patterned polarizing film comprises a retardation film having a quarter wavelength plate function.

13. The patterned polarizing film according to claim 11, wherein the retardation film having a quarter wavelength plate function has a reverse wavelength dispersibility.

14. A patterned polarizing film according to claim 1, wherein the substrate is a retardation film having a half wavelength plate function, and wherein a retardation film having a quarter wavelength plate function is further laminated on the substrate.

15. The patterned polarizing film according to claim 11, wherein the patterned circular polarizing plate further comprises a positive C film.

16. A process for producing a patterned polarizing film according to claim 1, the process comprising the following steps (1) to (4):
(1) a step of applying a composition comprising a polymerizable liquid crystal compound and a dichroic dye to a surface of a substrate or a substrate on which an orientation layer has been formed,
(2) a step of orienting the applied polymerizable liquid crystal compound and the applied dichroic dye,
(3) a step of applying an active energy ray to the oriented polymerizable liquid crystal compound through a photomask, thereby obtaining a liquid crystal cured layer comprising a polymer of the polymerizable liquid crystal compound and an unpolymerized polymerizable liquid crystal compound, and
(4) a step of washing the liquid crystal cured layer with a solvent in which the dichroic dye has a saturated solubility at 23° C. of 1% by mass or lower, and thereby removing the unpolymerized polymerizable liquid crystal compound, thereby obtaining a patterned liquid crystal cured layer.

17. The process for producing a patterned polarizing film according to claim 16, wherein the substrate is a resin substrate.

18. The process for producing a patterned polarizing film according to claim 16, wherein the solvent is a solvent comprising an alcohol solvent.

19. The process for producing a patterned polarizing film according to claim 16, wherein the active energy ray is applied while the photomask is pressed to the oriented polymerizable liquid crystal compound.

20. The process for producing a patterned polarizing film according to claim 16, wherein the active energy ray is an ultraviolet ray that is parallel to the normal direction of a surface of the substrate.

* * * * *